United States Patent
Sen et al.

(10) Patent No.: US 12,088,370 B2
(45) Date of Patent: Sep. 10, 2024

(54) PARALLEL SHIFT ESTIMATION FOR LOS MIMO COMMUNICATION

(71) Applicant: QUALCOMM Incorporated, San Diego, CA (US)

(72) Inventors: Pinar Sen, San Diego, CA (US); Seyong Park, San Diego, CA (US); Abdelrahman Mohamed Ahmed Mohamed Ibrahim, San Diego, CA (US); Renqiu Wang, San Diego, CA (US); Peter Gaal, San Diego, CA (US); Naga Bhushan, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/954,198

(22) Filed: Sep. 27, 2022

(65) Prior Publication Data

US 2024/0106503 A1   Mar. 28, 2024

(51) Int. Cl.
  *H04B 7/0456* (2017.01)
  *H01Q 3/26* (2006.01)
  *H04B 7/0417* (2017.01)

(52) U.S. Cl.
  CPC .......... *H04B 7/046* (2013.01); *H01Q 3/267* (2013.01); *H04B 7/0421* (2013.01)

(58) Field of Classification Search
  CPC ........ H04B 7/46; H04B 7/0421; H01Q 3/267
  See application file for complete search history.

(56) References Cited

U.S. PATENT DOCUMENTS

| | | | | |
|---|---|---|---|---|
| 11,722,188 B1 * | 8/2023 | Sen | ............ | H04B 7/0456 375/267 |
| 11,722,202 B1 * | 8/2023 | Neshaastegaran | ... | H04B 7/0617 375/267 |
| 11,855,731 B1 | 12/2023 | Park | | |
| 2004/0190657 A1 * | 9/2004 | Seki | ............ | H04B 7/01 375/148 |
| 2010/0008216 A1 * | 1/2010 | Li | ............ | H04L 27/2662 370/344 |
| 2019/0020384 A1 * | 1/2019 | Kamiya | ............ | H04B 7/005 |

(Continued)

FOREIGN PATENT DOCUMENTS

| | | | |
|---|---|---|---|
| EP | 3979517 A1 | 4/2022 | |
| WO | WO-2021107348 A1 * | 6/2021 | ............ H04B 17/12 |

OTHER PUBLICATIONS

International Search Report and Written Opinion—PCT/US2023/074125—ISA/EPO—Dec. 12, 2023.

(Continued)

*Primary Examiner* — Jaison Joseph
(74) *Attorney, Agent, or Firm* — QUALCOMM Incorporated

(57) ABSTRACT

Methods and apparatuses for wireless communication for line-of-sight Multiple-Input-Multiple-Output (LOS MIMO) are described. A first pilot signal is transmitted to a second device. The first pilot signal is at least one of a constant phase pilot or a linear phase ramped pilot for estimating a misalignment of a second antenna array of the second device with respect to a first antenna array of the first device.

28 Claims, 14 Drawing Sheets

(56) References Cited

U.S. PATENT DOCUMENTS

| | | | | |
|---|---|---|---|---|
| 2020/0358482 A1* | 11/2020 | Coldrey | ............... | H04B 7/0617 |
| 2021/0091908 A1* | 3/2021 | Gwinn, IV | .............. | G01S 7/534 |
| 2023/0147008 A1* | 5/2023 | Nilsson | ............... | H04W 56/001 |
| | | | | 370/350 |
| 2023/0268976 A1* | 8/2023 | Neshaastegaran | ....... | H04B 7/01 |
| | | | | 375/267 |
| 2023/0344122 A1* | 10/2023 | Sen | ........................ | H04B 17/12 |
| 2023/0370860 A1* | 11/2023 | Sen | ...................... | H04B 7/0617 |

OTHER PUBLICATIONS

Moon J., et al., "Line-of-Sight Communications with Antenna Misalignments", ICC 2021—IEEE International Conference on Communications, IEEE, Jun. 14, 2021, XP033953930, 6 pages, figures 1, 2, 5, section II.

* cited by examiner

PARALLEL SHIFT ESTIMATION FOR LOS MIMO COMMUNICATION

BACKGROUND

Field of the Disclosure

The present disclosure relates, for example, to wireless communication systems and more particularly to communication systems using line-of-sight (LOS) multiple-input, multiple-output (MIMO) technique.

Description of Related Art

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, or discrete Fourier transform spread orthogonal frequency division multiplexing (DFT-S-OFDM).

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). In general, fixed antenna-arrays of devices, cannot easily change their location or orientation, wherein the communication performance of LOS wireless communication strongly depends on possible misalignments of the antenna arrays of the respective communication devices.

Thus, a misalignment of antenna arrays can significantly degrade the communication performance depending on the type and amount of misalignment.

SUMMARY

The described techniques relate to improved methods, systems, devices, and apparatuses that support line-of-sight (LOS) MIMO.

In some aspects, a transmitting device, also called a "first device" hereinafter, (e.g., a base station, integrated access and backhaul (IAB) node, relay node, network node, gNB, user equipment (UE), etc.) and a receiving device, also called a "second device" hereinafter, (e.g., UE, base station, IAB node, relay node, Customer Premises Equipment (CPE), drones, etc.) may communicate by line-of-sight (LOS) MIMO.

In some aspects, the LOS MIMO communication occurs in a backhaul link between the transmitting device (e.g. a network node) and the receiving device (e.g. a relay) or in an access link between a transmitting device (e.g. a network node or relay) and a receiving device (e.g. a UE).

A method for wireless communication at a first or transmitting device for line-of-sight multiple-input-multiple-output (LOS MIMO) is described. The method comprises transmitting a first pilot signal to a second device, wherein the first pilot signal is at least one of a constant phase pilot, or a linear phase ramped pilot for estimating a misalignment of a second antenna array of the second device with respect to a first antenna array of the first device.

It is beneficial to estimate an antenna array misalignment, as specified by the present disclosure, to improve LOS MIMO communication performance. In particular, the use of different pilot signals (e.g., a constant phase pilot or a linear phase ramped pilot) provides an improved technique for initiating the misalignment estimation procedure.

An apparatus for wireless communication at a first device for LOS MIMO is described. The apparatus comprises a processor, memory in electronic communication with the processor, and instructions stored in the memory. The instructions are executable by the processor to cause the apparatus to transmit a first pilot signal to a second device, wherein the first pilot signal is at least one of a constant phase pilot, or a linear phase ramped pilot for estimating a misalignment of a second antenna array of the second device with respect to a first antenna array of the first device.

Another apparatus for wireless communication at a first device for LOS MIMO is described. The apparatus comprises means for transmitting a first pilot signal to a second device, wherein the first pilot signal is at least one of a constant phase pilot, or a linear phase ramped pilot for estimating a misalignment of a second antenna array of the second device with respect to a first antenna array of the first device.

A non-transitory computer-readable medium storing code for wireless communication at a first/transmitting device is described. The code comprises instructions executable by a processor to transmit a first pilot signal to a second device, wherein the first pilot signal is at least one of a constant phase pilot, or a linear phase ramped pilot for estimating a misalignment of a second antenna array of the second device with respect to a first antenna array of the first device.

A method for wireless communication at a second or receiving device for line-of-sight multiple-input-multiple-output (LOS MIMO) is described. The method comprises receiving a first pilot signal, from a first device, wherein the first pilot signal is at least one of a constant phase pilot, or a linear phase ramped pilot, estimating a misalignment of a second antenna array of the second device with respect to a first antenna array of the first device.

It is beneficial to estimate an antenna array misalignment, as specified by the present disclosure, to improve LOS MIMO communication performance. In particular, the use of different pilot signals (e.g., a constant phase pilot or a linear phase ramped pilot) provides an improved technique for initiating the misalignment estimation procedure.

An apparatus for wireless communication at a second device for LOS MIMO is described. The apparatus comprises a processor, memory in electronic communication with the processor, and instructions stored in the memory. The instructions are executable by the processor to cause the apparatus to receive a first pilot signal, from a first device, wherein the first pilot signal is at least one of a constant phase pilot or a linear phase ramped pilot, to estimate a misalignment of a second antenna array of the second device with respect to a first antenna array of the first device.

Another apparatus for wireless communication at a second device for LOS MIMO is described. The apparatus comprises means for receiving a first pilot signal, from a first device, wherein the first pilot signal is at least one of a constant phase pilot or a linear phase ramped pilot, means for estimating a misalignment of a second antenna array of the second device with respect to a first antenna array of the first device.

A non-transitory computer-readable medium storing code for wireless communication at a second device is described. The code comprises instructions executable by a processor to receive a first pilot signal, from a first device, wherein the first pilot signal is at least one of a constant phase pilot, or a linear phase ramped pilot, to estimate a misalignment of a second antenna array of the second device with respect to a first antenna array of the first device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings.

It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

In general, line-of-sight multiple-input, multiple-output (LOS MIMO) can provide a high multiplexing gain for certain conditions. A high multiplexing gain can be achieved when a distance between an antenna array of a transmitting device (Tx) (the term "transmitting device" is interchangeable and can be replaced by a more general term, for example "first device") and an antenna array of a receiving device (Rx) (the term "receiving device" is interchangeable and can be replaced by a more general term, for example "second device") does not exceed a certain threshold. This threshold, in turn, depends on parameters like apertures of Tx and Rx antenna arrays or carrier frequency. A further condition for achieving high multiplexing gain can be the use of an accurate LOS MIMO precoder. An accurate precoder, in turn, depends for example on the channel knowledge at the TX side, a distance feedback and a possible antenna array misalignment compensation.

A high performance gain can be achieved when the Tx and Rx antenna array are perfectly aligned (e.g. the antenna arrays are facing each other and the centers are aligned). However, a misalignment of antenna arrays can significantly degrade the performance depending on the type and amount of misalignment. In most of the deployment scenarios for LOS MIMO the Tx and Rx antenna arrays have a fixed position, or at least remain in a certain position for a longer period of time. In general, fixed antenna-arrays cannot easily change their location or orientation. Thus, the communication performance of LOS wireless communications strongly depends on possible misalignments of the antenna arrays of the respective communication devices (e.g., misalignment of Tx antenna array, or Rx antenna array, or both).

Aspects of the present disclosure provide apparatuses, methods, processing systems, and computer readable mediums for LOS MIMO communications relating to antenna array misalignment compensations.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

There are multiple deployment scenarios with different requirements with respect to LOS MIMO. For example, LOS MIMO can be deployed in a backhaul link between a network node (e.g., gNB, IAB, side link (SL) UE, etc.) and relay (IAB, smart repeater, customer premises equipment (CPE), drones, etc.). In another example, LOS MIMO can be deployed in an access link between network node/relay and UE.

Figure 1:
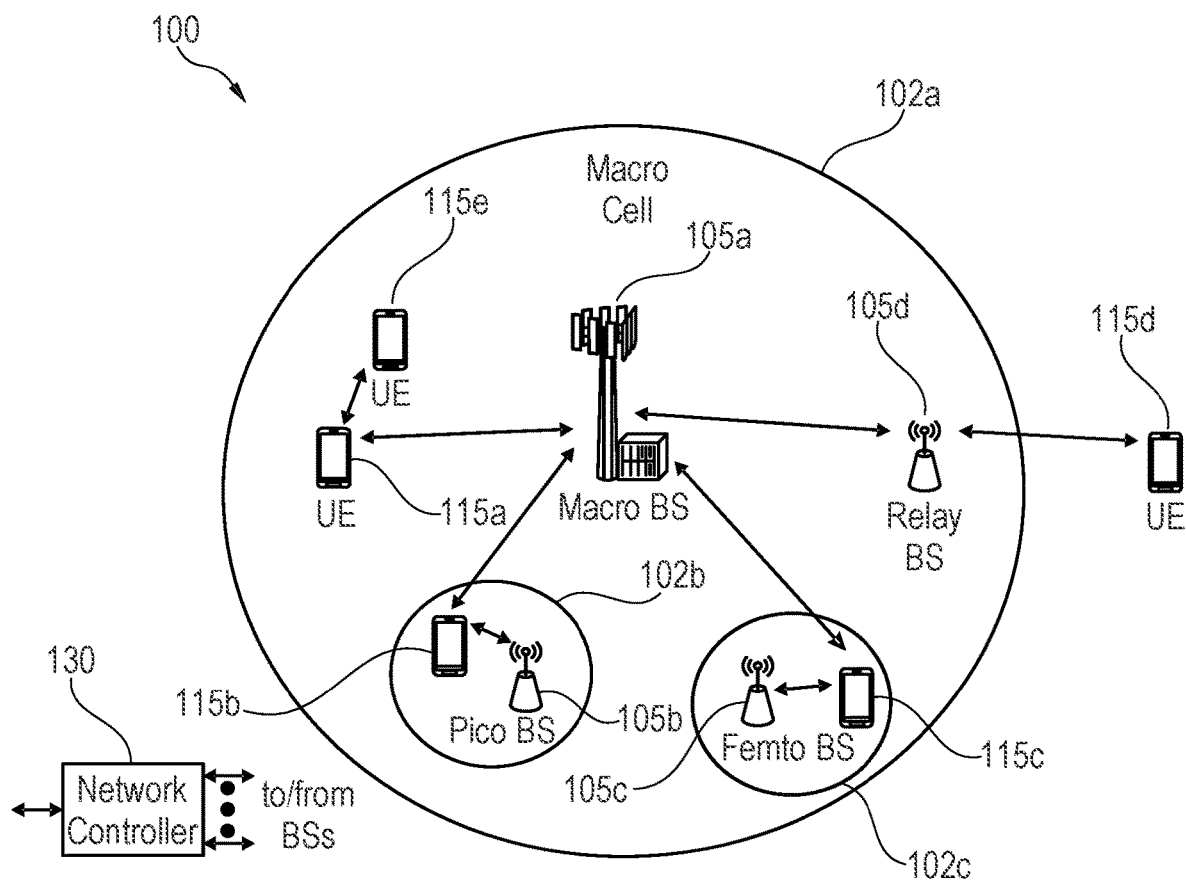
FIG. 1 illustrates an exemplary wireless network, in accordance with various aspects of the present disclosure.

FIG. 1 illustrates an exemplary wireless network 100, in accordance with various aspects of the present disclosure. The wireless network 100 may be or may include elements of a 5G (NR) network, an LTE network, 6G network, and/or the like. The wireless network 100 may include a number of base stations (BS) 105 (shown as BS 105a, BS 105b, BS 105c, and BS 105d) and other network entities. A base station is an entity that communicates with user equipments (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 105a may be a macro BS for a macro cell 102a, a BS 105b may be a pico BS for a pico cell 102b, and a BS 105c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations 105d. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 105d may communicate with macro BS 105a and a UE 115d in order to facilitate communication between BS 105a and UE 115d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 115 (e.g., 115a, 115b, 115c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity or or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 115 may be included inside a housing that houses components of UE 115, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR, 5G RAT networks or future 6G RAT technologies, may be deployed.

In some aspects, two or more UEs 115 (e.g., shown as UE 115a and UE 115e) may communicate directly using one or more sidelink channels (e.g., without using a base station 105 as an intermediary to communicate with one another). For example, the UEs 115 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 115 may perform scheduling operations, resource selection operations, and/or other operations described elsewhere herein as being performed by the base station 105.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In an example relating to FIG. 1, a transmitting (Tx) device 105 (e.g. a base station) or a receiving (Rx) device 105 (e.g. CPE, relay, IAB, smart repeater, drones, UE) may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), wherein the transmitting device can be equipped with multiple antennas and the receiving device can be equipped with one or multiple antennas.

Conventional MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices. In the conventional MIMO systems the signal from the transmitting device travels through a plurality of paths due to reflections and environmental influences.

In upcoming 3rd Generation Partnership Project (3GPP) releases (e.g., release 19 and beyond) the line-of-sight (LOS) MIMO technology may gain in importance. By using a line-of-sight propagation, the respective signals travel in a direct path from a first device (e.g., transmitting device) to a second device (e.g., receiving device), or vice versa.

As indicated above, FIG. 1 is provided as an example. Other examples may differ from what is described with regard to FIG. 1.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Figure 2:
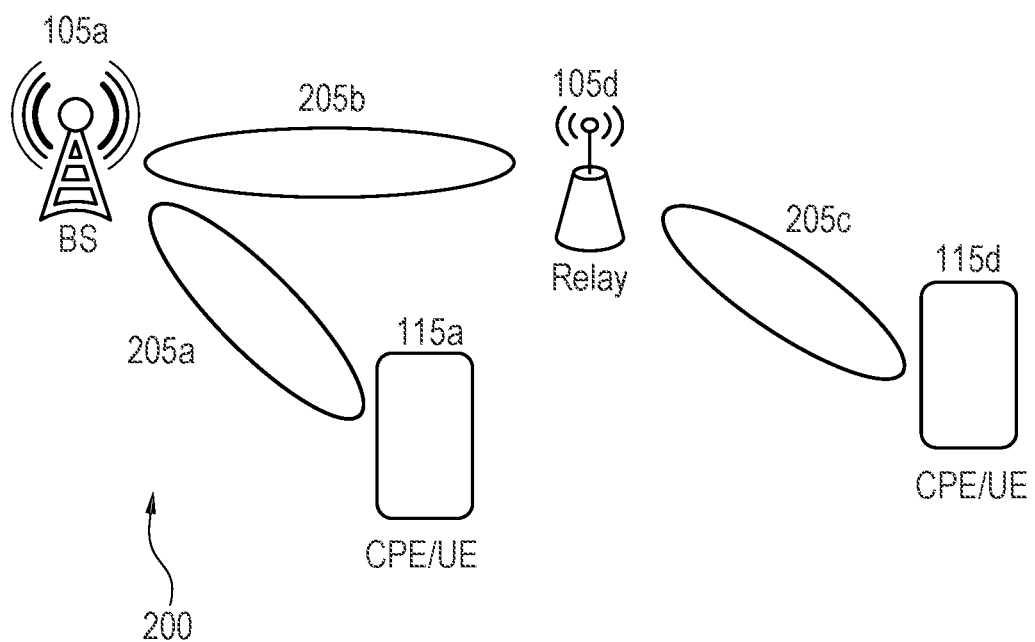
FIG. 2 illustrates an exemplary transmitting device in communication with a receiving device in a wireless network, in accordance with various aspects of the present disclosure.

FIG. 2 illustrates an exemplary wireless communications system that supports communication via LOS MIMO in accordance with aspects of the present disclosure. In some examples, wireless communications system 200 may implement aspects of wireless communications system 100. In some examples, the wireless communications system 200 may be an example of a sixth generation (6G) system, a fifth generation (5G) system, or other generation of system. In the exemplary communication system 200, the communication devices (e.g. base station 105a, relay 105d, CPE/UE 115a, 115d) may transmit or receive beams over a communication link 205a, 205b, or 205c. For example, LOS MIMO communication may occur in a backhaul link 205b between the transmitting device (e.g., a network node or base station 105a) and the receiving device (e.g., a relay 105d) or in an access link 205a, 205c between a transmitting device (e.g. a network node, base station 105a, or relay 105d) and a receiving device (e.g., a UE 115a, 115d).

Further, although shown as between the base station 105a and the UE 115a, the base station 105a or the UE 115a, or both, may transmit or receive signals (e.g., pilot signals) to or from other wireless devices, such as peer devices. For example, the base station 105a may transmit or receive a pilot signal to or from another base station 105 and the UE 115a may transmit or receive a pilot signal to or from another UE 115 by implementing the described techniques without exceeding the scope of the present disclosure. Additionally, or alternatively, techniques as discussed herein may be used in communications between IAB nodes, relay nodes, access points, other wireless devices, or any combinations thereof.

Aligned Antenna Arrays

The present disclosure is directed to line-of-sight (LOS) MIMO for wireless communication, which will gain importance in upcoming 3GPP releases. In a line-of-sight propagation the signals travel in a direct path from a first device (e.g., transmitting device) to a second device (e.g., receiving device).

In some cases, the antennas of the first device (e.g., base station, relay, transmitting device etc.) or a second device (e.g., a UE, CPE, relay, receiving device, etc.) may comprise one or more antenna arrays, which may support MIMO operations, or transmit or receive beamforming.

For example, one or more base station antennas or antenna arrays may be co-located at an antenna assembly, such as an antenna tower. In some cases, antennas or antenna arrays associated with a base station 105 may be located in diverse geographic locations. In some examples, a base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In other examples, an antenna array of a first or second device may have circular arranged antennas.

It is desirable, to achieve a high performance of the LOS MIMO wireless communication. Therefore, it might be advantageous if the antenna arrays of a first and second device are aligned with each other. Possible misalignment of the antenna arrays can result in a performance loss of the LOS MIMO communication.

Figure 3:
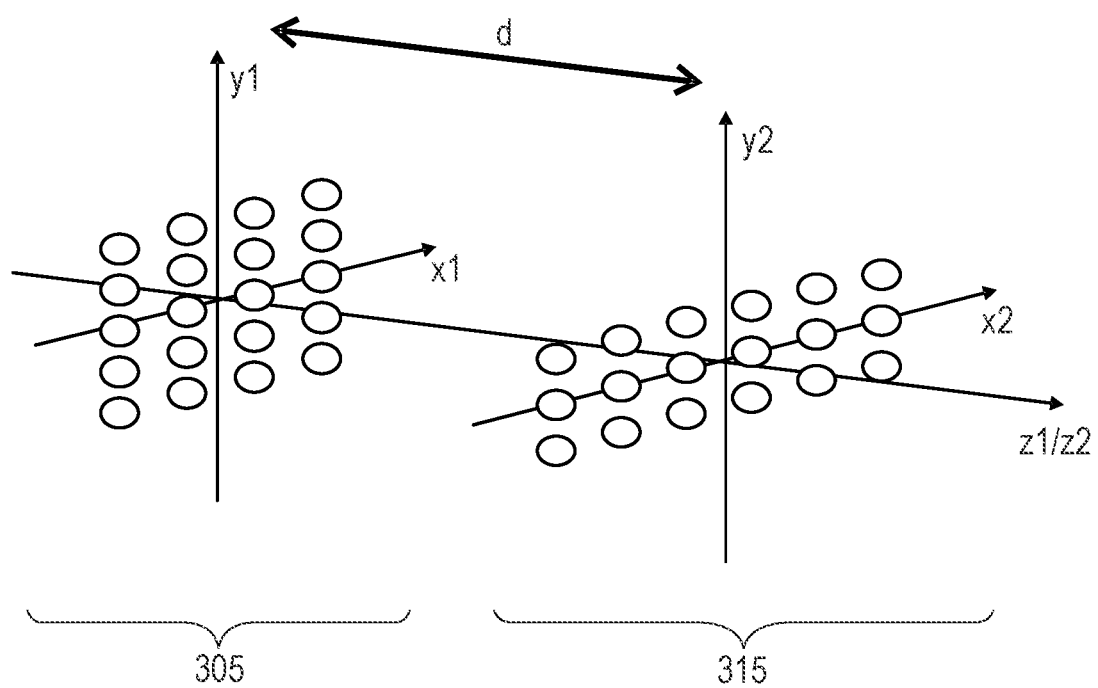
FIG. 3 illustrates an exemplary antenna array of a transmitting device and an exemplary antenna array of a receiving device, in accordance with various aspects of the present disclosure.

FIG. 3 illustrates an exemplary antenna array 305 of a first device (e.g., a transmitting device) in alignment with an exemplary antenna array 315 of a second device (e.g., a receiving device).

In FIG. 3, the antenna array 305 of the first device is located in a first x-y plane (FIG. 3: defined by x1 and y1) of a first coordinate system (x1/y1/z1), wherein the antenna array 315 of the second device is located in a second x-y plane (FIG. 3: defined by x2 and y2) of a second coordinate system (x2, y2, z2), the second x-y plane being parallel to the first x-y plane, wherein the origin of the second plane or second coordinate system (x2=0, y2=0, z2=0) is located on the z-axis of the first coordinate system (z1) (as shown in FIG. 3). Please note, that the z-axis (z1) of the first coordinate system is parallel to the z-axis (z2) of the second coordinate system.

In the example of FIG. 3, the center of the first antenna array is located on the origin of the first x-y plane/coordinate system, wherein the center of the second antenna array is located on the origin of the second x-y plane/coordinate system. Furthermore, the first and second antenna array are facing each other. Thus, the antenna arrays are aligned.

In general, a polarized channel matrix can be described by the Rician channel model: $H = aH_{LOS} + bH_{NLOS}$, wherein $H_{LOS}$ represents a line-of-sight component and $H_{NLOS}$ a non-line-of-sight component (having rich randomness). In particular, the elements of $H_{LOS}$ depend on $$h_{LOS,jk} \sim \frac{\exp\left(-i2\pi\frac{r_{jk}}{\lambda}\right)}{r_{jk}/\lambda}.$$

Wherein $r_{jk}$ corresponds to the distance of the kth transmitter antenna to the jth receiver antenna; $H_{NLOS} \in \{$i.i.d. Rayleigh, CDL-x, TDL-x$\}$ and $a^2+b^2=1$, where LOS percentage=$a^2$.

For LOS MIMO, an exemplary antenna array can be designed circular, in 1D or 2D. Referring to the Rician channel model, the LOS component is strong (a>>b) for LOS MIMO and the SVD based precoder is implicit and benefits from the special structure of the channel (limited/no CSF).

On the contrary, for massive MIMO (mMIMO), the channel matrix has a weak LOS component (a<b) and the SVD based precoder is explicit, wherein CSF is needed at Tx side to compute SVD.

Misalignment of Antenna Arrays

To achieve high communication performance for LOS MIMO, it is beneficial to have aligned antenna arrays of communicating devices (e.g., antenna arrays of a first and second device). Otherwise, a misalignment of the antenna arrays may result in a performance loss of LOS MIMO communication.

As already illustrated with respect to FIG. 3, the perfectly aligned case may be achieved, when a first and second antenna array are located in parallel x-y planes, wherein the center of the respective first and second antenna arrays coincides with the respective coordinate system origin (that is the antenna arrays should face each other).

Figure 4A:
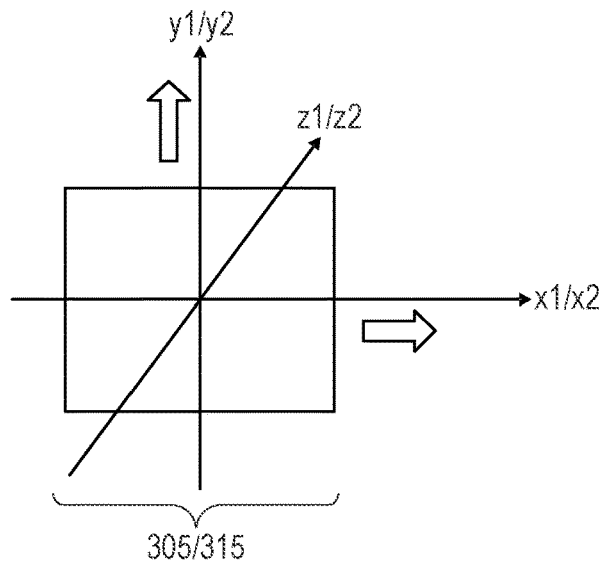
FIG. 4a illustrates an exemplary antenna array misalignment, in accordance with various aspects of the present disclosure.
Figure 4B:
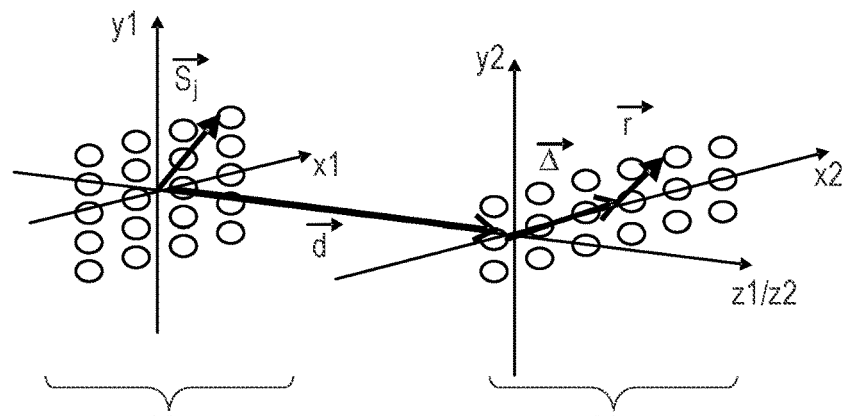
FIG. 4b illustrates an exemplary antenna array misalignment, in accordance with various aspects of the present disclosure.

However, an antenna array misalignment can significantly degrade the communication performance depending on the type and amount of misalignment. FIGS. 4a, b and c illustrate examples of different types of antenna array (305, 315) misalignments of a first (e.g. Tx) or second (e.g. Rx) device. FIGS. 4a and 4b provides examples, wherein the center of the first 305 or second 315 antenna arrays are shifted in the x-y plane by a so-called parallel shift.

In particular, the arrows in FIG. 4a indicate a possible antenna array shift in x-direction, or y-direction.

FIG. 4b illustrates an exemplary second antenna array 315 which is parallel shifted (by Δ) in the x-direction. In FIG. 4b, the center of the second antenna array 315 does not coincide with the origin of the second coordinate system. Thus, the first 305 and second 315 antenna array are not aligned. The parallel shift (without rotational misalignment) corresponds to an exemplary misalignment, wherein the antenna arrays cannot directly face each other.

Figure 4C:
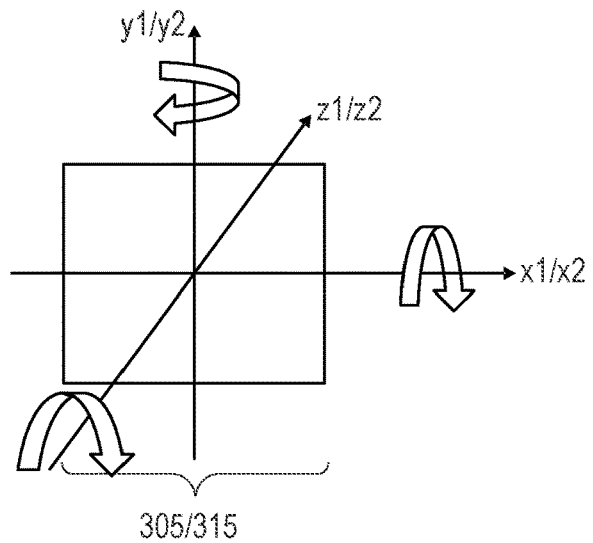
FIG. 4c illustrates an exemplary antenna array misalignment, in accordance with various aspects of the present disclosure.

In the example of FIG. 4c a rotational misalignment of an exemplary antenna array is shown. In particular, a rotational misalignment can occur, when the antenna array is rotated with respect to the z-axis (parallel rotation) or with respect to the x-axis or y-axis (perpendicular rotation).

The present disclosure relates to parallel shift misalignment, in particular to a parallel shift misalignment estimation. However, additional rotational misalignments can occur in some examples. In general, a suitable estimation of an antenna array misalignment (e.g., parallel shift) allows compensating the misalignment of a transmitting or receiving device. The number of techniques described herein are focused on estimating and compensating the parallel shift misalignment. In addition, for the misalignment estimation, a new pilot design is introduced.

Figure 5:
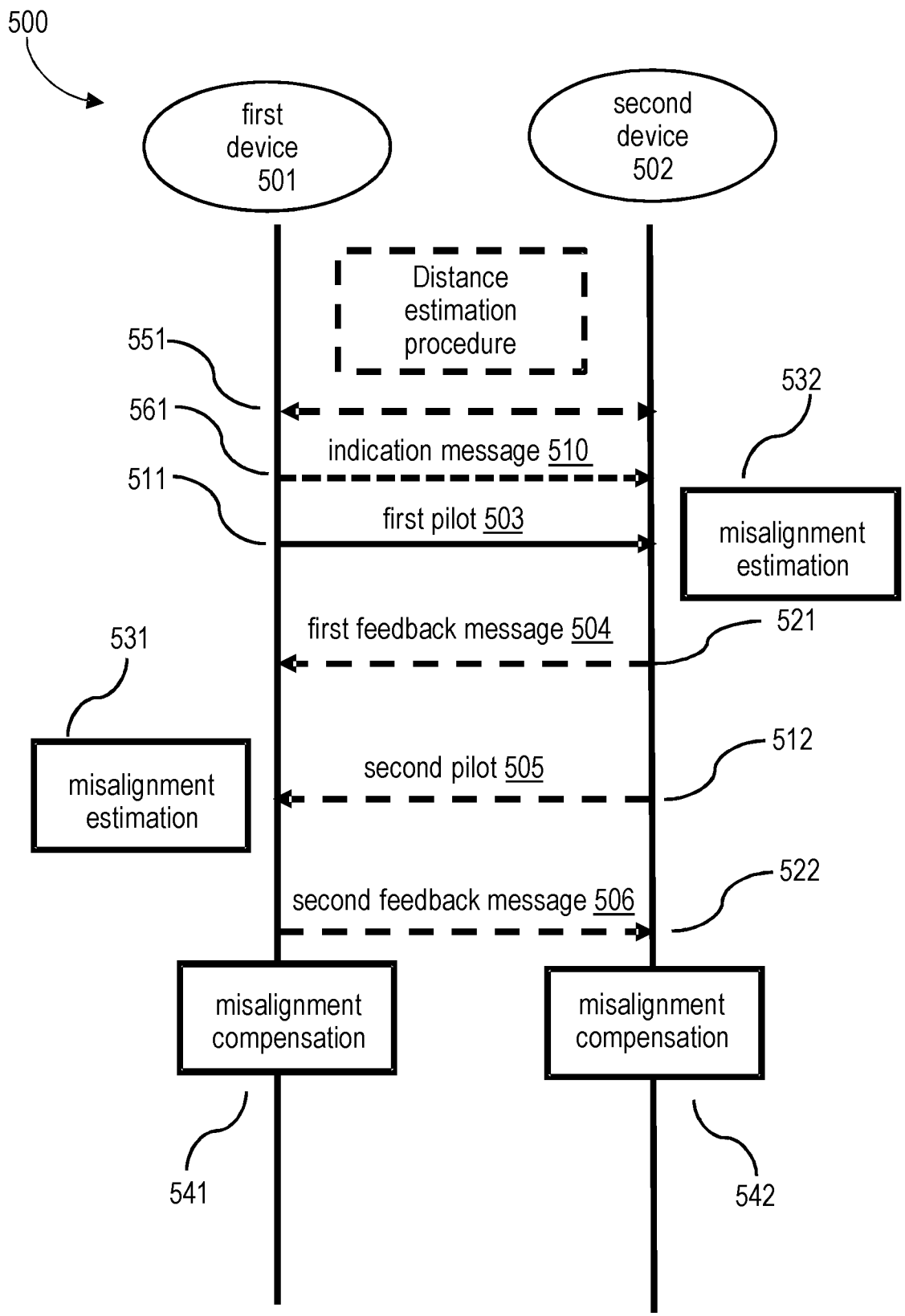
FIG. 5 illustrates an exemplary process flow for estimating an antenna array misalignment in accordance with aspects of the present disclosure.

FIG. 5 illustrates an exemplary process flow 500 that supports estimating an antenna array misalignment in accordance with aspects of the present disclosure. Please note that the dotted lines represent optional process flow steps.

Figure 6A:
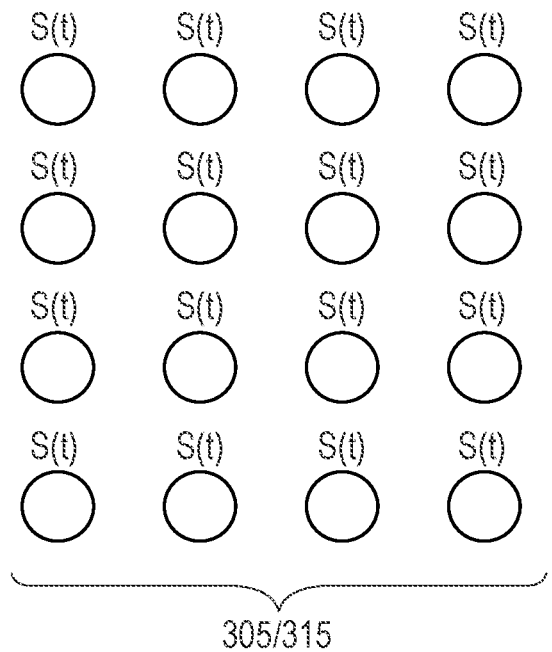
FIG. 6a illustrates an exemplary antenna array, which generates a constant phase pilot.
Figure 6B:
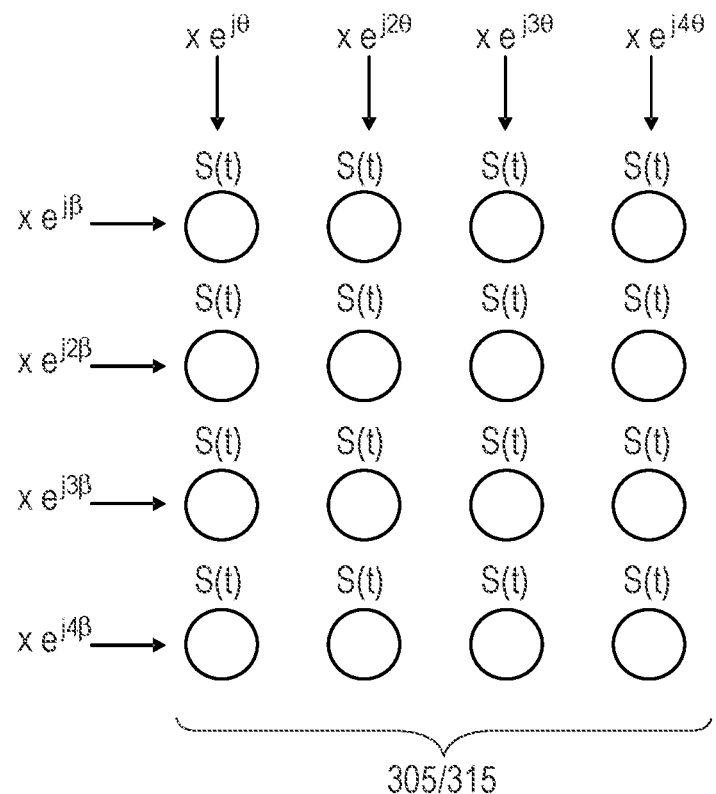
FIG. 6b illustrates an exemplary antenna array, which generates a linear phase ramped pilot.
Figure 7:
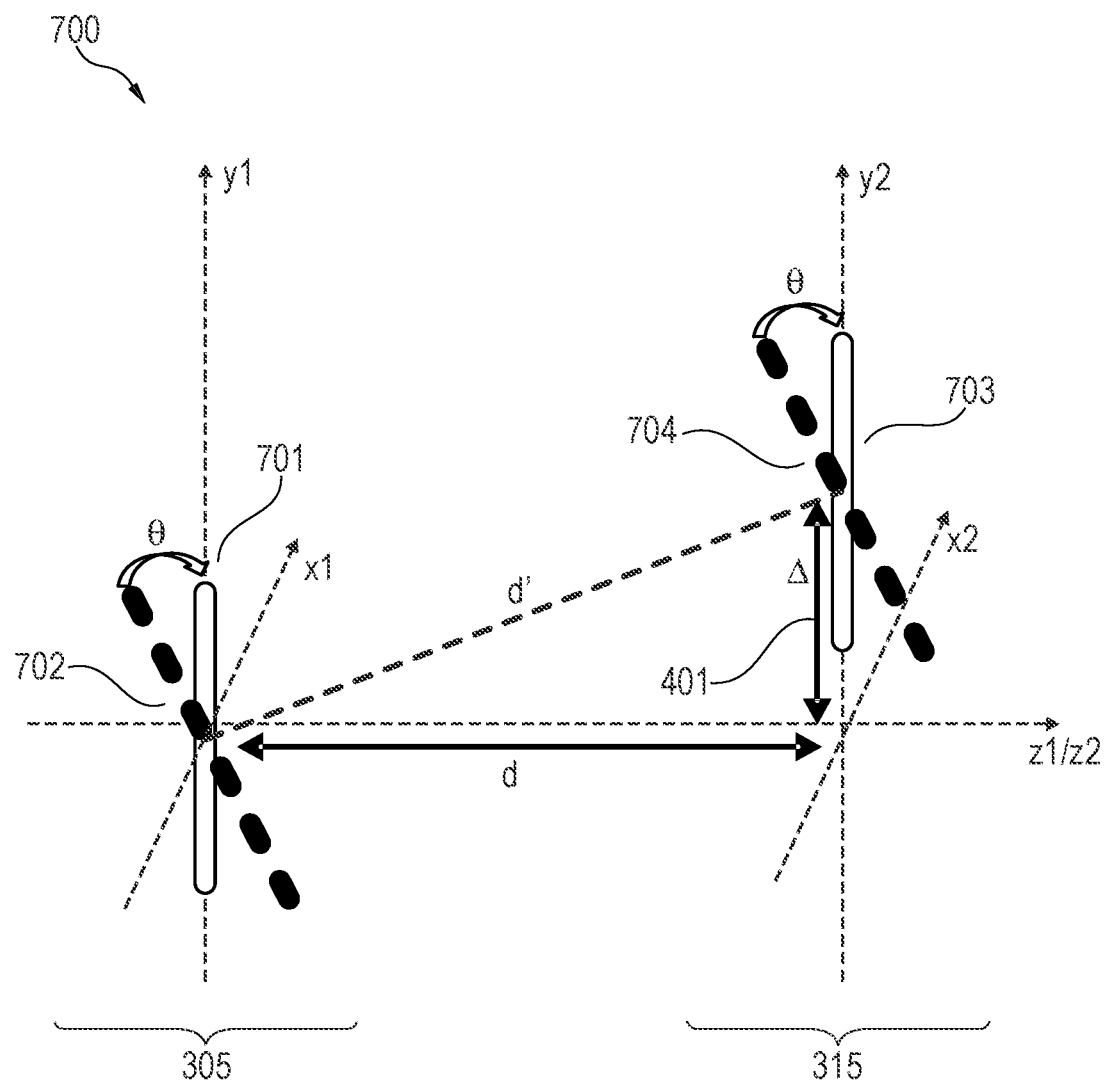
FIG. 7 illustrates an exemplary antenna array misalignment, in accordance with various aspects of the present disclosure.

In some examples of FIG. 5, the parallel shift can be estimated by converting the parallel shift to a x-y rotation (as illustrated with respect to FIGS. 6 and 7).

Figure 9:
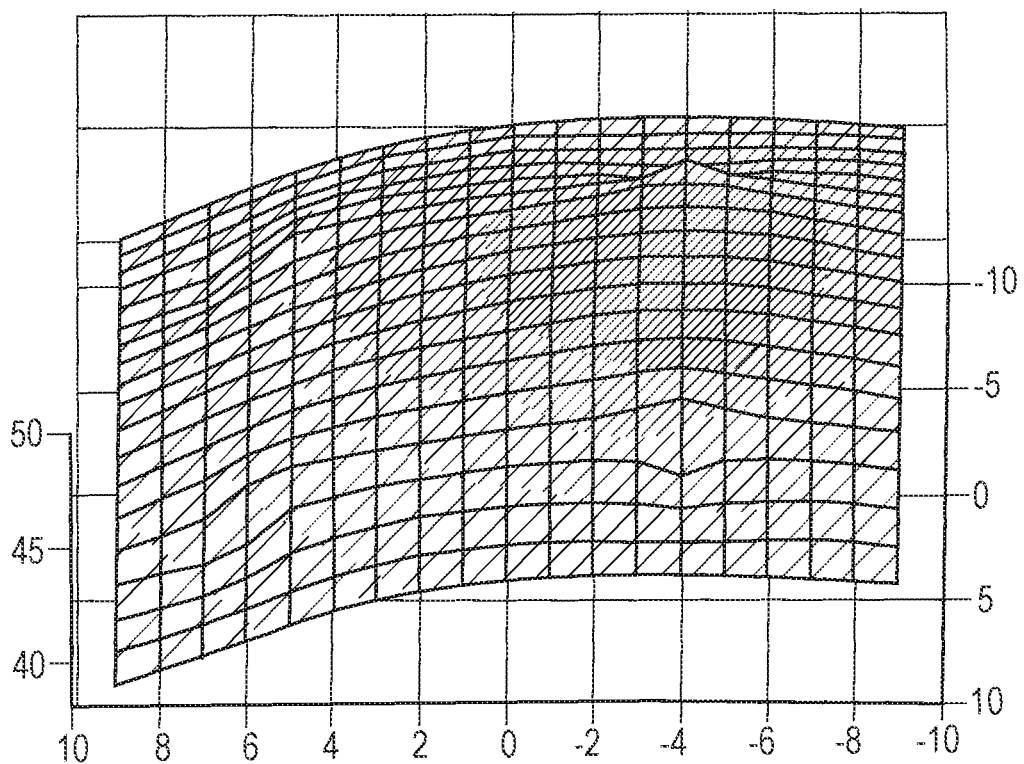
FIG. 9 illustrates an inner product of a received phase and projected phase for direct shift estimation.

In other examples, the parallel shift can be directly estimated (as illustrated with respect to FIG. 9).

In some examples, process flow 500 may implement aspects of wireless communications system 100 or 200 (shown with respect to FIG. 1 or FIG. 2). The process flow 500 may illustrate LOS MIMO based communication between a first device 501 having a first antenna array 305 and a second device 502 having a second antenna array 315. The first and second device may be examples of other devices described herein, such as transmitting device, relay, base station 105, as well as, receiving device, UE or CPE 115 etc. Please note that a receiving device can also be configured to transmit or feedback signals to the transmitting device, wherein the transmitting device can also be configured to receive the transmitted signals of the receiving device. Alternative examples of the process flow may be implemented, in which some features are performed in a different order than described or are not performed at all. In some examples, operations may include additional features not mentioned below, or further operations may be added.

At 511, the first device 501, having a first antenna array 305, may transmit a first pilot signal 503 to a second device 502, having a second antenna array 315. In particular, the first pilot signal 503 is at least one of a constant phase pilot, or a linear phase ramped pilot for estimating 532 a misalignment of a second antenna array 315 of the second device 502 with respect to a first antenna array 305 of the first device 501.

In an example, the second device 502 may receive the first pilot signal 503, from the first device 501, wherein the first pilot signal 503 may be at least one of a constant phase pilot, or a linear phase ramped pilot for estimating a misalignment 532 of a second antenna array 315 of the second device 502 with respect to a first antenna array 305 of the first device 305.

In some examples, estimating the misalignment 532 may comprise estimating a parallel shift of the second antenna array 315 with respect to the first antenna array 305.

At 532, the misalignment of the second antenna array 315 might be estimated by estimating the parallel shift of the second antenna array 315 with respect to the first antenna array 305. For the parallel shift estimation, different estimation methods can be used. For example, the parallel shift can be estimated by using a rotational based estimation (the rotational based estimation is explained in more detail with respect to FIG. 7 and FIG. 8a and FIG. 8b) or a direct shift estimation (the direct shift estimation is explained in more detail with respect to FIG. 9).

In some examples, the first pilot signal 503 may be a constant phase pilot. FIG. 7a illustrates an exemplary antenna array proving a constant phase pilot. As illustrated in FIG. 7 the constant phase pilot can be generated by using identical reference signals (RS) at each antenna of the second antenna array. For example, the constant phase pilot can be used to indicate the rotational based parallel shift estimation.

In other examples, the first pilot signal 503 may be a linear phase ramped pilot. FIG. 7b illustrates an exemplary antenna array proving a linear phase ramped pilot, wherein the signal of each antenna of the antenna array is modulated by respective phase rotations ($e^{j\theta}$, $e^{j2\theta}$, $e^{j3\theta}$, $e^{j4\theta}$, $e^{j\beta}$, $e^{j2\beta}$, $e^{j3\beta}$, $e^{j4\beta}$). For example, the linear phase ramped pilot can be used to indicate the direct shift estimation.

In an optional step 521, the first device 501 may receive a first feedback message 504 from the second device 502, based on the estimated misalignment of the second antenna array 315 with respect to the first antenna array 305.

At 512, the second device 502 may transmit a second pilot signal 505 to the first device 501 for estimating a misalignment of the first antenna array 305 of the first device 501 with respect to the second antenna array 315 of the second device 502.

Furthermore, at 512, the first device 501 may receive a second pilot signal 505 from the second device 502, wherein the second pilot signal 505 maybe at least one of a constant phase pilot, or a linear phase ramped pilot. Then, the first device 501 may estimate a misalignment 531 of the first antenna array 305 of the first device 501 with respect to the second antenna array 315 of the second device 502.

In some examples, estimating the misalignment 531 may comprise estimating a parallel shift of the first antenna array 305 with respect to the second antenna array 315.

At 531, the misalignment of the first antenna array 305 might be estimated by estimating the parallel shift of the first antenna array 305 with respect to the second antenna array 315. For the parallel shift estimation, different estimation methods can be used. For example, the parallel shift can be estimated by using a rotational based estimation (the rotational based estimation is explained in more detail with respect to FIG. 7 and FIG. 8a and FIG. 8b) or a direct shift estimation (the direct shift estimation is explained in more detail with respect to FIG. 9).

In some examples, the second pilot signal 505 may be a constant phase pilot. For example, the constant phase pilot can be generated by using identical reference signals (RS) at each antenna of the second antenna array. For example, the constant phase pilot can be used to indicate the rotational based parallel shift estimation.

In other examples, the second pilot signal 505 may be a linear phase ramped pilot. For example, the linear phase ramped pilot can be used to indicate the direct shift estimation.

At an optional step 522, the first device 501 may transmit a second feedback message 506 to the second device 502, based on the estimated misalignment 531 of the first antenna array 305 with respect to the second antenna array 315. In addition, the second device 502 may receive the second feedback message 506 from the first device 501, based on the estimated misalignment (at 531) of the first antenna array 305 with respect to the second antenna array 315.

At 541 the first device 501 may compensate for the estimated misalignment at the first antenna array 305.

In some examples, the compensating may comprise beam steering, based on applying the estimated parallel shift to a precoder matrix.

In other examples (not shown), the estimated misalignment can be solved by physically aligning the antenna arrays of the first and second devices.

At 542, the second device 502 may compensate for the estimated misalignment at the second antenna array 315.

In some examples, compensating may comprise implicit compensating with MMSE receiver. For example, instead of applying a post-processor matrix, the receiver can apply MMSE filtering to estimate transmitted data symbols.

In other examples, compensating may comprise beam steering, based on applying the estimated parallel shift to a post-processing matrix.

In other examples (not shown), the estimated misalignment can be solved by physically aligning the antenna arrays of the first and second devices.

In an optional step 551, the first and second devices execute a distance estimation procedure prior to submission of the first pilot signal 503. Therefore, the first device 501 may transmit an indication 507 to the second device 502 to estimate a distance with respect to the first antenna array 305 of the first device 501 and the second antenna array 315 of the second device 502. Then, the first device receives feedback 509 from the second device based on the estimated distance.

Alternatively or additionally to the distance estimation procedure, the first device 501 may send another indication 510 (e.g. an indication message, or second indication) to the second device, at 561.

In an example, the indication 510 may comprise an indication to estimate the misalignment (e.g., parallel shift) by estimating at least one of an X rotation or a Y rotation of the second device, wherein the indication may be based on the constant phase first pilot signal 503.

In another example, the indication 510 may comprise an indication to estimate the misalignment by direct estimation, wherein the indication may be based on the linear phase ramped first pilot signal 503.

In some examples, the indication 510 to estimate the misalignment may be based on the estimated distance (e.g., of the distance estimation procedure, at 551) with respect to the first antenna array 305 of the first device 501 and the second antenna array 315 of the second device 315.

In some examples, the first device 501 may transmit an indication 510 of the first pilot signal (e.g., indicating a constant phase pilot or a linear phase ramped pilot) by Radio Resource Control (RRC) signaling prior to transmitting the first pilot signal.

In some examples, the indication 510 may comprise an indication to use the constant phase pilot signal 503, when the estimated distance (obtained at step 551) may be below a certain threshold, or an indication to use the linear phase ramped pilot signal, when the estimated distance (obtained at step 551) is above a certain threshold.

Rotational Based Estimation

The present disclosure relates to estimating a misalignment (comprising a parallel shift) of a first antenna array of a first device with respect to a second antenna array of a second device, or of a second antenna array of a second device with respect to a first antenna array of a first device. One way to estimate a parallel shift misalignment of antenna arrays is to apply a rotational based estimation.

FIG. 7 represents an exemplary approach for rotational based parallel shift estimation and is not intended to limit the scope of the present invention.

FIG. 7 illustrates a first antenna array 305 and a second antenna array 315, wherein the second antenna array 315 is shifted by a parallel shift Δ (along the y-axis) with respect to the first antenna array 305. The first antenna array 305 may be an antenna array of a first device 501 (e.g., transmitting device) and the second antenna array 315 may be an antenna array of a second device 502 (e.g., receiving device). Please note that a receiving device can also be configured to transmit or feedback signals to the transmitting device, wherein the transmitting device can also be configured to receive the transmitted signals of the receiving device. In particular, the first, or so-called transmitting device can be, for example, a base station, gNB, IAB, relay, or UE etc. In addition, the second, or so-called receiving, device might be an IAB, smart repeater, CPE, drones, or UE etc.

As indicated in FIG. 7, the antenna array 305 of the first device can be located in a first x-y plane (defined by x1 and y1) of a first coordinate system (e.g. x1, y1 and z1), wherein the antenna array 315 of the second device can be located in a second x-y plane (defined by x2 and y2) of a second coordinate system (e.g. x1, y2, and z2), the second x-y plane might be parallel to the first x-y plane, wherein the origin of the second coordinate system (or origin of the second x-y-plane) may be located on the z-axis of the first coordinate system.

In the example of FIG. 7, the x-axis of the first x-y plane and x-axis of the second x-y plane are parallel, and the y-axis of the first x-y plane and y-axis of the second x-y plane are parallel.

In some examples (not shown), a parallel shift of the first antenna array may be in the first x-y plane.

In some examples (e.g. in FIG. 7), a parallel shift of the second antenna array may be in the second x-y plane. FIG. 7 represents a specific (and not limiting) example, wherein the second antenna array is shifted along the y2-axis in the second x-y plane (defined by x2 and y2).

In the example of FIG. 7, the x-y planes of the first and second antenna arrays (305 and 315) are spaced by distance d, wherein the second antenna array 315 is parallel shifted in the second x-y plane along the y2-axis by the parallel shift Δ. For the parallel shift estimation (as exemplarily shown in FIG. 7), it is assumed that the actual orientations 701 and 703 of the first and second antenna arrays correspond to (assumed) rotated antenna array orientations 702 and 704. In FIG. 7, the actual position is shown as a solid line and the (assumed) rotated position is shown as a dotted line. By assuming that the antenna arrays are rotated by θ the actual distance of the center of the first antenna array and the center of the second antenna array can be calculated by d'=d/cos(θ). θ can be calculated by θ=arctan (Δ/d).

The following provides exemplary embodiments of the present disclosure with respect to the rotational based parallel shift estimation.

In some examples, a first pilot signal (503 FIG. 5) is transmitted from a first 305 antenna array of a first device to estimate an antenna array rotation θ at the other side (e.g., rotation of the second antenna array of the second device).

In some examples, a second pilot signal (505 FIG. 5) is transmitted from a second 315 antenna array of a second device to estimate an antenna array rotation θ at the other side (e.g., rotation of the first antenna array of the first device).

In some examples, a first device may transmit a first pilot signal to a second device, wherein the first pilot signal may be at least one of a constant phase pilot, or a linear phase ramped pilot for estimating a misalignment of a second antenna array 315 of the second device (at the second device) with respect to a first antenna array 305 of the first device.

In some examples, the second device may receive a first pilot signal from the first device, wherein the first pilot signal is at least one of a constant phase pilot, or a linear phase ramped pilot.

In some examples, the first pilot signal may be a constant phase pilot. For example, the constant phase pilot can be generated by using identical reference signals (RS) at each antenna of the first antenna array.

In some examples, the constant phase pilot can be used to indicate the rotational based parallel shift estimation.

In some examples, the second device may estimate a misalignment of a second antenna array of the second device with respect to a first antenna array of the first device.

In some examples, estimating the misalignment may comprise estimating a parallel shift of the second antenna array with respect to the first antenna array.

In some examples, estimating the parallel shift $\Delta$ may comprise estimating a parallel shift along the x-axis of the second x-y plane by estimating a rotation 704 (e.g., $\theta \neq 0$) of the second antenna array 315 with respect to the x-axis (X rotation) of the second x-y plane.

Additionally or alternatively, in some examples, estimating the parallel shift $\Delta$ may comprise estimating a parallel shift along the y-axis of the second x-y plane by estimating a rotation (e.g., $\theta \neq 0$) of the second antenna array with respect to the y-axis (Y rotation) of the second x-y plane, wherein estimating can be based on the received first pilot signal.

In some examples, the second device may transmit feedback to the first device, based on the estimated misalignment of the second antenna array with respect to the first antenna array.

In some examples, the second device may compensate for the estimated misalignment at the second device.

In some examples, the first device may receive feedback from the second device, based on the estimated misalignment of the second antenna array with respect to the first antenna array.

In some optional examples, the first device may receive a second pilot signal from the second device, wherein the second pilot signal may be at least one of a constant phase pilot, or a linear phase ramped pilot. In some examples, the first device may estimate a misalignment of the first antenna array 305 of the first device with respect to the second antenna array 315 of the second device, wherein estimating the misalignment may comprise estimating a parallel shift $\Delta$ of the first antenna array 305 with respect to the second antenna array 315. In some examples, the second pilot signal may be a constant phase pilot.

In some examples, estimating the parallel shift $\Delta$ may comprise estimating at least one of a parallel shift along the x-axis of the first x-y plane by estimating a rotation of the first antenna array with respect to the x-axis (X rotation) of the first x-y plane, or a parallel shift along the y-axis of the first x-y plane by estimating a rotation of the first antenna array with respect to the y-axis (Y rotation) of the first x-y plane.

In some examples, the first device may compensate for the estimated misalignment at the first antenna array.

In some examples, (e.g., as illustrated with respect to FIGS. 8a and 8b) estimating may generally be based on the received pilot signal.

Figure 8A:
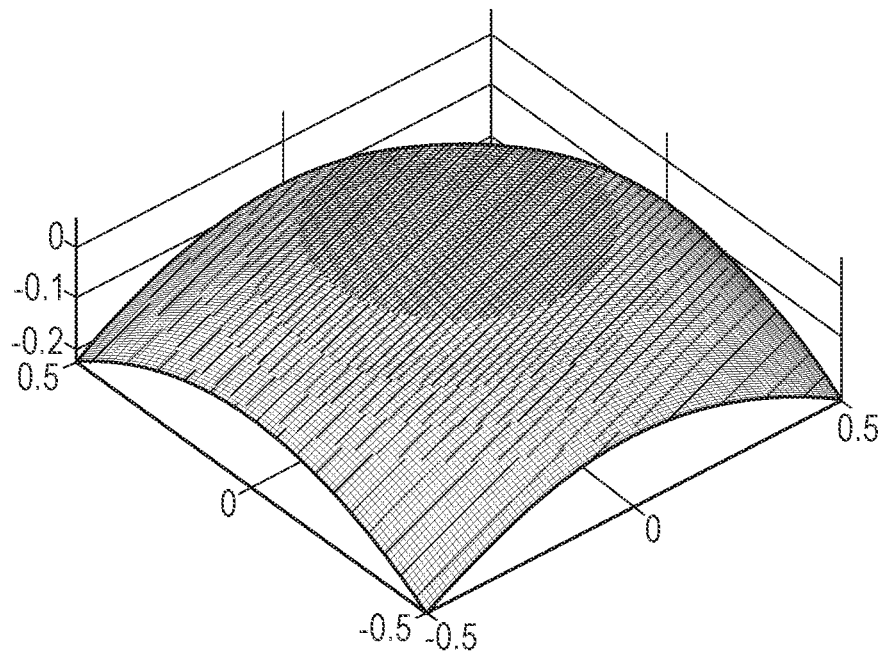
FIG. 8a illustrates an example of a detected phase of a pilot signal for rotational based shift estimation, in accordance with various aspects of the present disclosure.

FIG. 8a illustrates an example of a received phase diagram based on a constant phase pilot signal, when the first antenna array of the first device and the second antenna array of the second device are aligned (e.g. parallel shift $\Delta=0$ and, estimated X-, or Y-rotation $\theta=0$).

In some examples, a constant phase pilot can be generated by using identical reference signals (RS) at each antenna of the second antenna array.

In an example, a phase of a received pilot signal may be detected by the second antenna array of the second device, or the first antenna array of the first device.

Figure 8B:
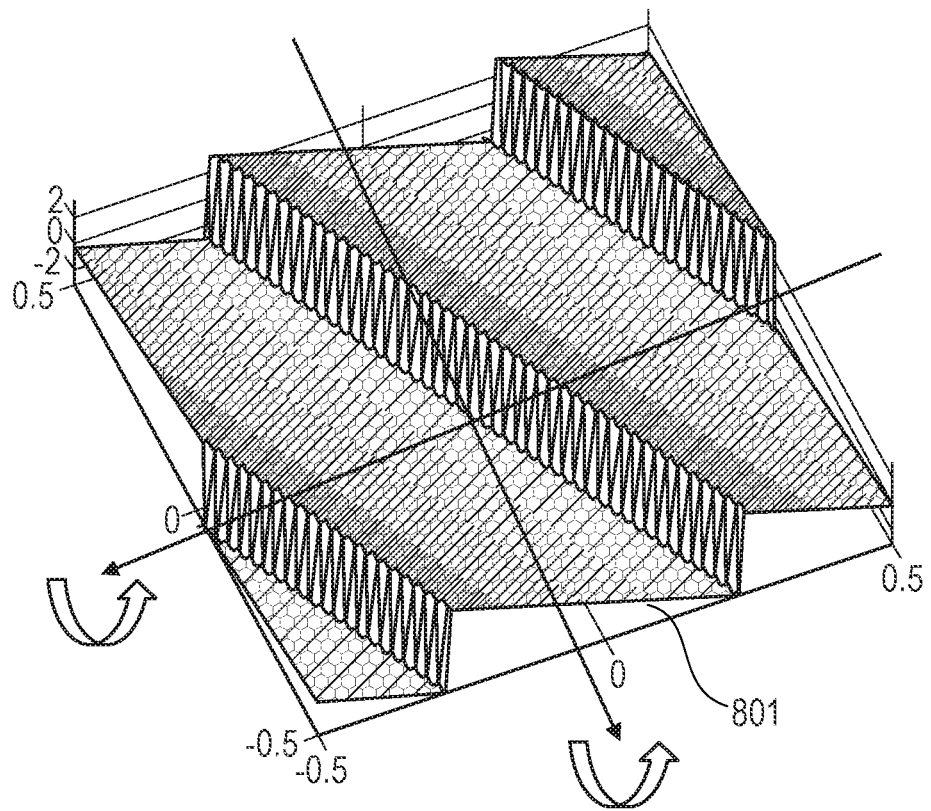
FIG. 8b illustrates an example of a detected phase of a pilot signal for rotational based shift estimation, in accordance with various aspects of the present disclosure.

FIG. 8b illustrates an example of a received phase diagram. Based on a constant phase pilot signal, when the first antenna array of the first device and the second antenna array of the second device are not aligned (e.g. parallel shift $\Delta \neq 0$ and, assumed X-, and/or Y-rotation $\theta \neq 0$). In the non-limiting example of FIG. 8b, a rotation is present in both, x-, and y-axis.

In general examples, estimating a rotation (e.g., at least one of X rotation, Y rotation, or both) of an antenna array can be based on determining a phase of the pilot signal on the respective antennas of the antenna array.

In some examples, estimating a rotation (e.g., at least one of X rotation, Y rotation, or both) of an antenna array can be based on determining at least one phase difference (or alternatively phase rotation) between two adjacent antennas of the antenna array.

In some examples, estimation of a parallel shift of an antenna array, using a rotation based estimation approach, may comprise determining a linear phase ramp based on averaging a plurality of estimates of phase difference between respective two adjacent antennas of the antenna array along the x-axis of the x-y plane, or (additional or alternatively) based on averaging a plurality of estimates of phase difference between respective two adjacent antennas of the antenna array along the y-axis of the x-y plane.

For illustration purposes of linear phase ramp determining, it can be assumed that $y_{ij}$ is a received signal at a single receive antenna element at the i'th row and j'th column of a receiver antenna array. Then, for the rotational based method, a phase ramp across x axis (across columns) is computed by taking the average of adjacent phase differences as below:

$$\frac{1}{4 \times 2} \sum_{i=1,j=1}^{i=4,j=2} \text{angle\_diff}(y_{ij}, y_{i,j+1}), \qquad \text{i.}$$

wherein angle_diff($y_{ij}$, $y_{i,j+1}$) denotes a function that outputs the angle difference between the complex inputs $y_{ij}$ and $y_{i,j+1}$.

As illustrated with respect to FIG. 8b, estimating a rotation (e.g., at least one of X rotation, Y rotation, or both) of an antenna array can be based on determining a linear phase ramp.

In some examples, determining the linear phase ramp comprises determining the slope of the phase ramp 801, shown in FIG. 8b.

In some examples, estimating the parallel shift can be based on determining the linear phase ramp.

In some examples, estimating the parallel shift may comprise converting the estimated rotation of the antenna array to the parallel shift.

In some examples, the rotational based parallel shift estimation can be initiated by the first device, or the second device.

In some examples, transmitting or receiving a constant phase pilot signal can initiate the rotational based parallel shift estimation, wherein the constant phase of the pilot signal may serve as indication for the rotational based parallel shift estimation.

In some examples, the indication to estimate the misalignment may be based on an estimated distance (e.g., of the distance estimation procedure; e.g., with respect to the first antenna array of the first device and the second antenna array of the second device). For the distance estimation procedure, reference is made to the examples with respect to FIG. 5.

In some examples with respect to FIG. 5, the indication 510 may comprise an indication to estimate the misalignment by rotational based parallel shift estimation, wherein the indication may be based on the constant phase first pilot signal.

In some examples, the indication may comprise an indication to use a constant phase for the pilot signal (or a constant phase pilot signal), when an estimated distance may be below a certain threshold, or an indication to use a linear phase ramp for the pilot signal (or a linear phase ramped pilot signal), when the estimated distance is above a certain threshold.

For example, the indication to use the linear phase ramped pilot signal may lead to a misalignment estimation by direct shift estimation approach.

Direct Estimation

The present invention relates to estimating an antenna array misalignment, comprising a parallel shift, e.g., a misalignment of a first antenna array of a first device with respect to a second antenna array of a second device, or of a second antenna array of a second device with respect to a first antenna array of a first device. One way to estimate the misalignment (e.g., a parallel shift of two antenna arrays) is to apply a direct estimation procedure.

In an example, estimating the parallel shift may comprise direct estimation of the parallel shift, wherein the direct estimation may be based on determining an inner product between a received pilot signal at the antennas of the second antenna array and a pilot signal projected based on one or more hypothesis of an antenna array shift.

FIG. 9 illustrates an inner product of a received phase and projected phase based on one or more hypothesis of an antenna array shift.

The peak, shown in FIG. 9, indicates the integer/fractional shifts (e.g., fractional parallel shifts=(½, ½); peak is found at =(½, ½)).

In general, there are various estimation algorithms known in the prior art, such as an inner product-based algorithm and a phase jump-based algorithm. However, the estimation range is limited to within the antenna panel for both estimation algorithms. Thus, the direct estimation algorithms can be applied for the estimation of small parallel shifts.

In some examples the first pilot signal (e.g., shown in FIG. 5), transmitted from a first device to a second device, may be a linear phase ramped pilot.

In some examples, the second pilot signal (e.g., shown in FIG. 5), transmitted from a second device to a first device, may be a linear phase ramped pilot.

In some examples, the linear phase ramped pilot can be used to indicate the direct shift estimation.

For example, the linear phase ramped pilot can be generated by using linear phase ramp at the antennas of the first antenna array (e.g., the example of FIG. 6b).

The use of linear phase ramped pilot signals is beneficial. For example, the pilot signals provide low auto-correlation property with parallel shifts.

In some examples, the direct parallel shift estimation can be initiated by the first device, or the second device.

In some examples, transmitting or receiving a linear phase ramped pilot signal can initiate the direct parallel shift estimation.

In some examples, the indication to estimate the misalignment may be based on an estimated distance (e.g., of the distance estimation procedure; e.g., with respect to the first antenna array of the first device and the second antenna array of the second device). For an exemplary distance estimation procedure, reference is made to the examples with respect to FIG. 5.

In some examples with respect to FIG. 5, the indication 510 may comprise an indication to estimate the misalignment by direct estimation, wherein the indication may be based on linear phase ramped first pilot signal.

In some examples, the indication (e.g., indication 510 in FIG. 5) may comprise an indication to use a constant phase pilot signal, when an estimated distance may be below a certain threshold, or an indication to use a linear phase ramp pilot signal, when the estimated distance is above a certain threshold.

For example, the indication to use the constant phase first pilot signal may lead to a misalignment estimation by rotational based estimation approach.

Rotational Based Estimation Vs. Direct Estimation

In general, distance estimation is may be needed for LOS MIMO. In such cases, a distance estimation procedure estimates a distance between a first antenna array of a first device and a second antenna array of a second device. In particular, the distance estimation procedure might occur before a misalignment estimation procedure between a first and second device. Thus, depending on the estimated distance, the rotational based estimation, or direct shift estimation can be initiated.

Figure 10:
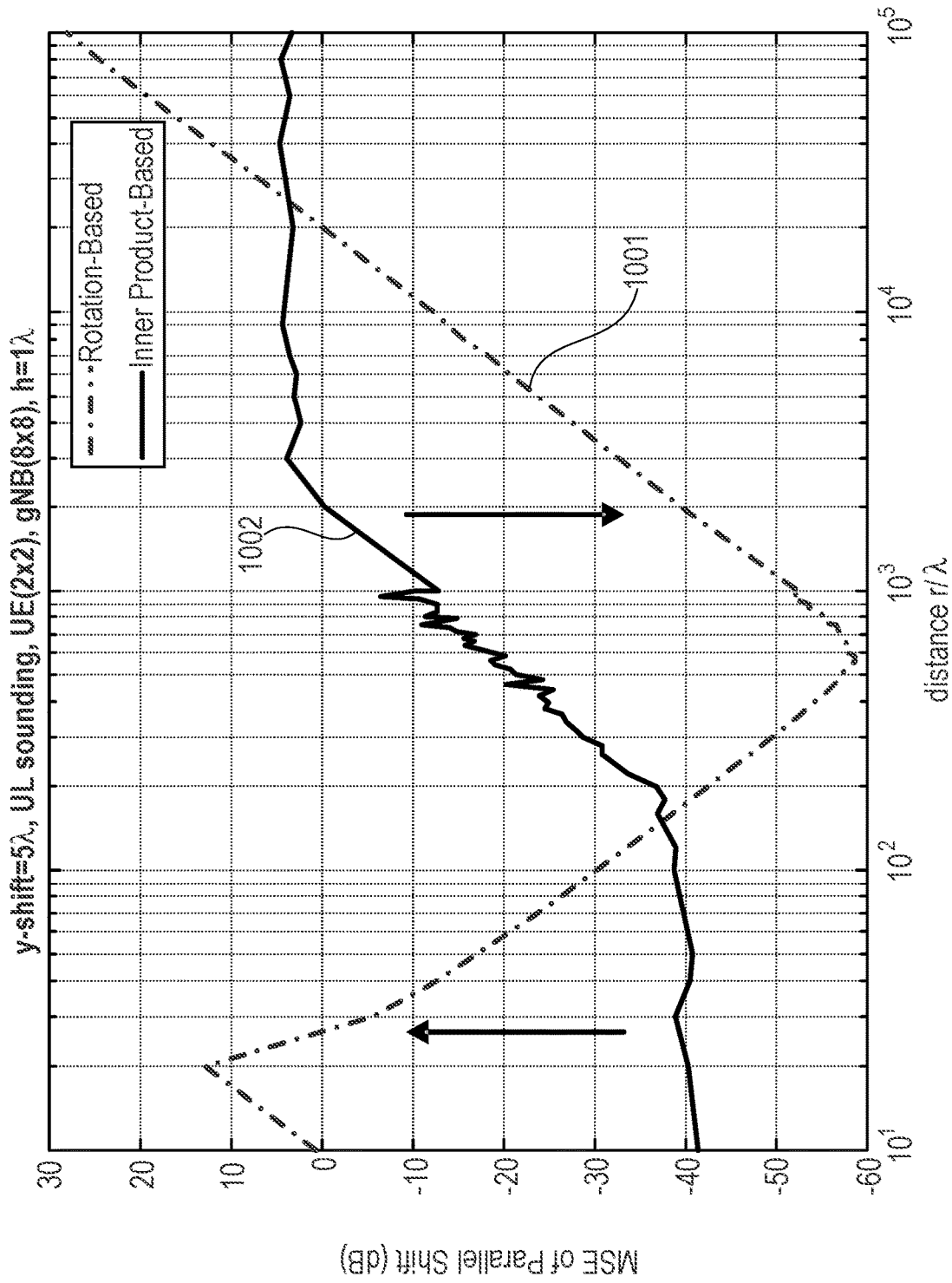
FIG. 10 illustrates an exemplary performance comparison of a rotational based parallel shift estimation and an inner product based direct shift estimation, in accordance with various aspects of the present disclosure.

FIG. 10 illustrates an example of a performance comparison between an exemplary rotational based estimation 1001 and the inner product based direct shift estimation 1002. FIG. 10 illustrates the mean square error (MSE) of parallel shift with regard to parameter $r/\lambda$, which depends on the distance r between the respective antenna arrays (e.g., first and second antenna array). The example of FIG. 5 relates to small parallel shifts (e.g., $\Delta_x=\Delta_y=52$). In particular, at small distances (e.g., $r/\lambda<\sim2\times10^3$), the (inner product based) direct shift estimation provides a better estimation, wherein at large distances (e.g., $r/\lambda>\sim2\times10^3$), the rotational based estimation provides a better estimation. However, it is to be noted that the rotational based compensation performance is still good for small distances (e.g., $r/\lambda<\sim2\times10^3$), too. Please note that the distances are often limited (e.g., $r/\lambda<\sim10^4$) for LOS MIMO communication.

In addition, using the rotational based shift estimation is beneficial, as the rotational based estimation also works for large shifts (because, in this instance, the phase shift matters, not the actual parallel shift estimate).

In some examples a first device can start with rotational based estimation and compensation, using a first set of pilots. If further tuning is needed and the distance the first antenna array and the second antenna array is small (for a better resolution of shift estimation), the first device may schedule an additional estimation procedure (e.g., direct shift estimation) using a second set of pilots and may apply compensation once again.

As illustrated in FIG. 10, it might be beneficial to use a distance estimation procedure to identify the best performing shift estimation method (e.g., rotational based estimation or direct shift estimation).

In some examples, a first device, having a first antenna array, indicates to a second device, having a second antenna array, which estimation method is to be used.

In some examples the indication depends on the distance between the misaligned antenna arrays (e.g., step 551 and 561 of FIG. 5).

Parallel Shift Compensation

The following provides a not-limiting example of the present invention and relates to compensating the estimated misalignment, in particular compensating the parallel shift between antenna arrays of different devices. In some examples, the misalignment estimation might be based on rotational based estimation or direct shift estimation.

In a case of perfectly aligned antenna arrays, a first (or transmitting) device 501 may use a precoder matrix V, wherein a second (or receiving) device 502 may use a post-processor matrix U for communication.

For illustrating the parallel shift compensation, reference is made to the exemplary antenna array misalignment of FIG. 4b.

In particular, the estimation of antenna array misalignments (e.g., a parallel shift in x-y plane) can provide knowledge about a 3D parallel shift vector A, as illustrated with respect to FIG. 4b.

In addition, the distance estimation procedure (exemplarily illustrated with respect to FIG. 5) can provide knowledge about a distance d between a first antenna array of a first (transmitting) device and a second antenna array of a second (receiving) device.

Based on the distance and misalignment estimation, the precoder matrix V can be updated on the transmitting side to a new precoder matrix $V_{new}$:

$$V_{ij}^{new} = V_{ij} e^{-j\frac{2\pi(\vec{s_j} \cdot \vec{\Delta})}{\lambda \|\vec{d}\|}}, \text{ for } i, j = 1, 2, \ldots, N$$

wherein $\vec{s_j}$ corresponds to local coordinates of the $j^{th}$ antenna of the first antenna array of the first (transmitting) device.

Based on the distance and misalignment estimation, the post-processing matrix can be updated on the receiving side to a new post-processing matrix $U^{new}$:

$$U_{ij}^{new} = U_{ij} e^{-j\frac{2\pi(\vec{r_i} \cdot \vec{\Delta})}{\lambda \|\vec{d}\|}}, \text{ for } i, j = 1, 2, \ldots, M$$

wherein $\vec{r_i}$ corresponds to local coordinates of the $i^{th}$ antenna of the second antenna array of the second (receiving) device.

For illustration purpose, reference is made to FIG. 4b showing $\vec{\Delta}$, d, $\vec{r_i}$ and $\vec{s_j}$.

In some examples, parallel shifts can be compensated at transmitter and receiver side (e.g., at first and second device) separately with beam steering.

In other examples, the receiver side compensation can be done implicitly with MMSE receiver.

For example, instead of applying a post-processor matrix, the receiver can apply MMSE filtering to estimate transmitted data symbols.

Figure 11:
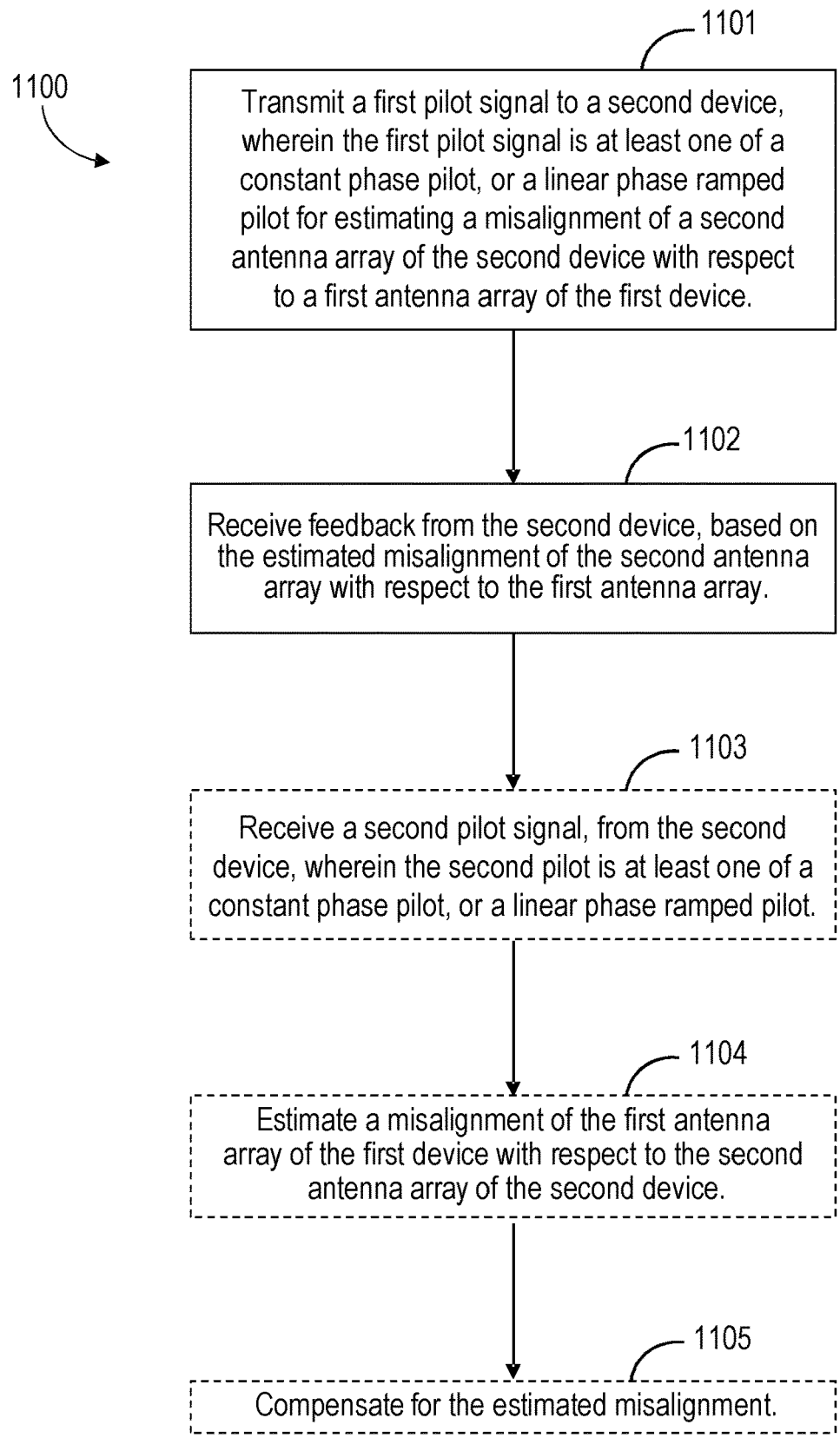
FIG. 11 illustrates a flow chart illustrating exemplary methods, which supports transmitting a first pilot signal, in accordance with aspects of the present disclosure.

FIG. 11 shows a diagram, illustrating an example process 1100 performed by an exemplary transmitter (or first device), in accordance with various aspects of the present disclosure. Process 1100 provides an example, wherein the transmitter (e.g., first device 501) performs operations associated with LOS MIMO based communication.

As shown in FIG. 11 (block 1101), in some aspects, process 1100 may comprise transmitting (e.g. using transmission component 1304, depicted in FIG. 13) a first pilot signal to a second device, wherein the first pilot signal may be a constant phase pilot signal or a linear phase ramped pilot signal for estimating a misalignment of a second antenna array of the second device with respect to a first antenna array of the first device.

As further shown in FIG. 11 (block 1102), in some aspects, process 1100 may comprise receiving (e.g. using receiving component 1302, depicted in FIG. 13) feedback from the second device, based on the estimated misalignment of the second antenna array with respect to the first antenna array.

As further shown in FIG. 11 (block 1103), in some optional aspects, process 1100 may comprise receiving (e.g. using receiving component 1302, depicted in FIG. 13) a second pilot signal from the second device, wherein the second pilot signal may be a constant phase pilot signal or a linear phase ramped pilot signal.

As further shown in FIG. 11 (block 1104), in some optional aspects, process 1100 may comprise estimating a misalignment of the first antenna array of the first device with respect to the second antenna array of the second device.

As further shown in FIG. 11 (block 1105), in some optional aspects, process 1100 may comprise compensating for the estimated misalignment. In particular, compensating may comprise at least one of compensating for the estimated misalignment of the first antenna array, or compensating for the estimated misalignment of the second antenna array.

Process 1100 may include additional aspects, such as any single aspect or any combination of aspects described below and/or in connection with one or more other processes described elsewhere herein.

In a first aspect, the first pilot signal may be a constant phase pilot signal.

In a second aspect, the constant phase pilot signal can be generated by using identical reference signals (RS) at each antenna of the first antenna array.

In a third aspect, the second pilot signal may be a constant phase pilot signal.

In some aspects, the constant phase pilot signal can be used to indicate the rotational based parallel shift procedure.

In some aspects, estimating the misalignment may comprise estimating a parallel shift of the first antenna array with respect to the second antenna array.

In fourth aspects, the antenna array of the first device may be located in a first x-y plane of a first coordinate system, wherein the antenna array of the second device may be located in a second x-y plane of a second coordinate system, the second x-y plane being parallel to the first x-y plane, wherein the origin of the second coordinate system may be located on the z-axis of the first coordinate system, wherein the parallel shift of the first antenna array can be in the first x-y plane, wherein the at least one of the first or second pilot signal may be a constant phase pilot, wherein estimating the parallel shift may comprise estimating at least one of a parallel shift along the x-axis of the first x-y plane by estimating a rotation of the first antenna array with respect to the x-axis (X rotation) of the first x-y plane, or a parallel shift along the y-axis of the first x-y plane by estimating a rotation of the first antenna array with respect to the y-axis (Y rotation) of the first x-y plane, wherein estimating can be based on the received second pilot signal. In some aspects, estimating the parallel shift comprises converting the estimated X or Y rotation of the first antenna array to the parallel shift.

In a fifth aspect, estimating at least one of X rotation and Y rotation of the first antenna array may be based on determining a phase of the received second pilot signal on the antennas of the first antenna array.

In a sixth aspect, estimating at least one of X rotation and Y rotation of the first antenna array may be based on determining a phase of the received second pilot signal on the antennas of the first antenna array.

In a seventh aspect, estimating at least one of X rotation Y rotation of the first antenna array may be based on determining at least one phase difference between two adjacent antennas of the first antenna array.

In an eighth aspect, the process 1100 may comprise determining a linear phase ramp based on at least one of averaging a plurality of estimates of phase difference between respective two adjacent antennas of the first antenna array along the x-axis of the first x-y plane, or averaging a plurality of estimates of phase difference between respective two adjacent antennas of the first antenna array along the y-axis of the first x-y plane.

In a ninth aspect, the x-axis of the first x-y plane and x-axis of the second x-y plane can be parallel, and/or the y-axis of the first x-y plane and y-axis of the second x-y plane can be parallel.

In a tenth aspect, estimating at least one of X rotation and Y rotation of the first antenna array may be based on determining the linear phase ramp.

In an eleventh aspect, estimating the parallel shift may be based on determining the linear phase ramp, wherein in some examples, estimating the parallel shift may comprise converting at least one of the estimated X and Y rotation of the first antenna array to the parallel shift.

In a twelfth aspect, estimating the parallel shift may comprise direct estimation of the parallel shift, wherein the direct estimation may be based on determining an inner product between a received pilot signal at the antennas of the first antenna array and a pilot signal projected based on one or more hypotheses of an antenna array shift.

In an thirteenth aspect, the first pilot signal may be a linear phase ramped pilot signal.

In a fourteenth aspect, the second pilot signal may be a linear phase ramped pilot signal.

In some aspects, the linear phase ramped pilot signal can be used to indicate the direct shift estimation procedure.

In a fifteenth aspect, compensating may comprise beam steering, based on applying the estimated parallel shift to a precoder matrix.

In a sixteenth aspect, the process 1100 may comprise transmitting to the second device an (e.g., a first) indication to estimate a distance with respect to the first antenna array of the first device and the second antenna array of the second device, and receiving feedback from the second device based on the estimated distance.

In a seventeenth aspect, the process 1100 may comprise transmitting to the second device, an (e.g., a second) indication to estimate the misalignment (in particular the parallel shift) by estimating at least one of X rotation and Y rotation of the second device, wherein the indication can be based on the constant phase first pilot signal.

In an eighteenth aspect, the process 1100 may comprise transmitting to the second device, an (e.g., second) indication to estimate the misalignment (in particular the parallel shift) by direct estimation, wherein the indication can based on of the linear phase ramped first pilot signal.

In a nineteenth aspect, the indication to estimate the misalignment is based on the estimated distance with respect to the first antenna array of the first device and the second antenna array of the second device.

In a twentieth aspect the process 1100 may comprise transmitting an (e.g., second) indication of the first pilot signal (indicating a constant phase pilot or a linear phase ramped pilot) by Radio Resource Control (RRC) signaling prior to transmitting the first pilot signal.

In a further aspect, the process 1100 may comprise transmitting a second indication to estimate the parallel shift by estimating at least one of X and Y rotation, when the estimated distance is below a certain threshold, or transmitting a second indication to estimate the parallel shift by direct estimation, when the estimated distance is above a certain threshold.

Transmission of a second indication that depends on the estimated distance can be advantageous. In particular, the estimated distance can be used to select an appropriate estimation procedure providing the highest communication performance (e.g. rotational based estimation or direct estimation).

Although FIG. 11 shows example blocks of the process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
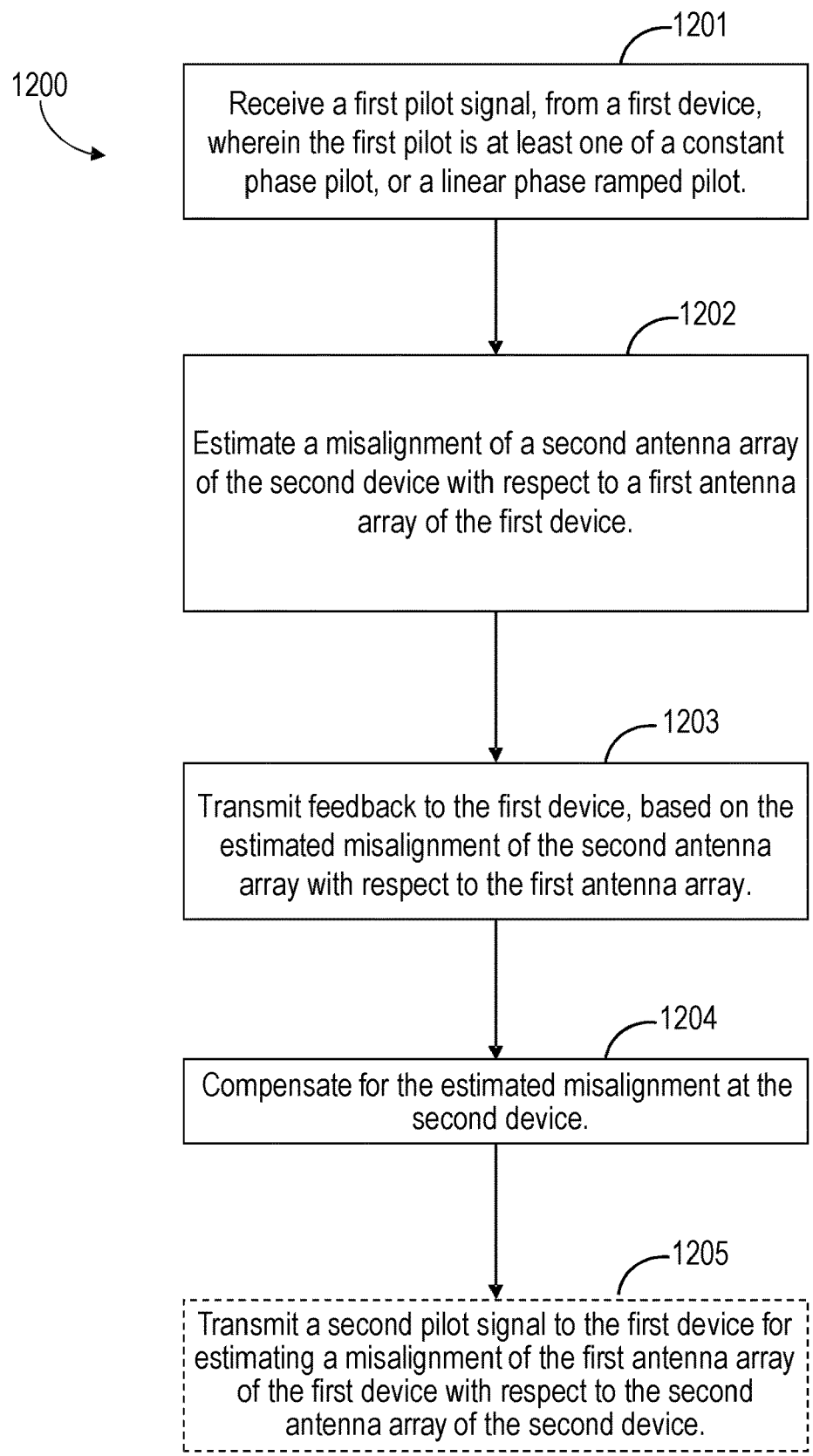
FIG. 12 illustrates a flow chart illustrating exemplary methods, which supports receiving a first pilot signal, in accordance with aspects of the present disclosure.

FIG. 12 is a diagram illustrating an example process 1200 performed, for example, by a receiver (or second device), in accordance with various aspects of the present disclosure. Example process 1200 provides an example wherein the receiver (e.g., second device 502) performs operations associated with LOS MIMO based communication.

As shown in FIG. 12 (block 1201), in some aspects, process 1200 may comprise receiving (e.g. using reception component 1402, depicted in FIG. 14) a first pilot signal, from a first device, wherein the first pilot signal may be a constant phase pilot signal or a linear phase ramped pilot signal.

As further shown in FIG. 12 (block 1202), in some aspects, process 1200 may comprise estimating a misalignment of a second antenna array of the second device with respect to a first antenna array of the first device.

As further shown in FIG. 12 (block 1203), in some aspects, process 1200 may comprise transmitting (e.g. using transmitting component 1404, depicted in FIG. 14) feedback to the first device, based on the estimated misalignment of the second antenna array with respect to the first antenna array.

As further shown in FIG. 12 (block 1204), in some optional aspects, process 1200 may comprise compensating for the estimated misalignment of the second device.

As further shown in FIG. 12 (block 1205), in some optional aspects, process 1200 may comprise transmitting (e.g., using transmitting component 1404, depicted in FIG. 14) a second pilot signal to the first device for estimating a misalignment of the first antenna array of the first device with respect to the second antenna array of the second device.

Process 1200 may include additional aspects, such as any single aspect or any combination of aspects described below and/or in connection with one or more other processes described elsewhere herein.

In a first aspect, the first pilot signal may be a constant phase pilot signal, or wherein the second pilot signal may be a constant phase pilot signal.

The constant phase pilot signal can be used to indicate the rotational based parallel shift estimation procedure.

In a second aspect, the constant phase pilot signal may be generated by using identical reference signals (RS) at each antenna of the second antenna array (e.g., example of FIG. 6a).

In some aspects, estimating the misalignment may comprise estimating a parallel shift of the second antenna array with respect to the first antenna array.

In a third aspect, the antenna array of the first device can be located in a first x-y plane of a first coordinate system, wherein the antenna array of the second device can be located in a second x-y plane of a second coordinate system, the second x-y plane being parallel to the first x-y plane, wherein the origin of the second coordinate system can be located on the z-axis of the first coordinate system, wherein the parallel shift of the second antenna array is in the second x-y plane, wherein at least the first pilot signal may be a constant phase pilot signal, wherein estimating the parallel shift comprises estimating at least one of a parallel shift along the x-axis of the second x-y plane by estimating a rotation of the second antenna array with respect to the x-axis (X rotation) of the second x-y plane, or a parallel shift along the y-axis of the second x-y plane by estimating a rotation of the second antenna array with respect to the y-axis (Y rotation) of the second x-y plane, wherein estimating is based on the received first pilot signal. In some aspects, estimating the parallel shift may comprise converting at least one of the estimated X rotation and Y rotation of the second antenna array to the parallel shift.

In a fourth aspect, estimating at least one of X rotation and Y rotation of the second antenna array may be based on determining a phase of the received first pilot signal on the antennas of the second antenna array, In a fifth aspect, estimating at least one of X rotation and Y rotation of the second antenna array may be based on determining at least one phase difference between two adjacent antennas of the second antenna array.

In a sixth aspect, the process 1200 may comprise determining a linear phase ramp based on at least one of averaging a plurality of estimates of phase difference between respective two adjacent antennas of the second antenna array along the x-axis of the second x-y plane, or averaging a plurality of estimates of phase difference between respective two adjacent antennas of the second antenna array along the y-axis of the second x-y plane.

In a seventh aspect, the x-axis of the first x-y plane and x-axis of the second x-y plane can be parallel, or the y-axis of the first x-y plane and y-axis of the second x-y plane can be parallel.

In an eighth aspect, estimating at least one of X rotation and Y rotation of the second antenna array may be based on determining the linear phase ramp.

In a ninth aspect, estimating the parallel shift may be based on determining the linear phase ramp.

In a tenth aspect, estimating the parallel shift may comprise converting the estimated X and/or Y rotation of the second antenna array to the parallel shift.

In an eleventh aspect, at least the first pilot signal may be a linear phase ramped pilot signal, and estimating the parallel shift may comprise direct estimation of the parallel shift, wherein the direct estimation is based on determining an inner product between the received pilot signal at the antennas of the second antenna array and a pilot signal projected based on one or more hypothesis of an antenna array shift.

In a twelfth aspect, the first pilot signal may be a linear phase ramped pilot signal.

In a thirteenth aspect, the second pilot signal may be a linear phase ramped pilot signal.

In some aspects, the linear phase ramped pilot signal can be used to indicate the direct shift estimation procedure.

In a fourteenth aspect, compensating may comprise implicit compensating with MMSE receiver. For example, instead of applying a post-processor matrix, the receiver can apply MMSE filtering to estimate transmitted data symbols.

In a fifteenth aspect, compensating may comprise beam steering, based on applying the estimated parallel shift to a post-processing matrix.

In a sixteenth aspect, the process 1200 may comprise receiving from the first device, an (e.g., first) indication to estimate a distance with respect to the first antenna array of the first device and the second antenna array of the second device, and estimating the distance with respect to the first antenna array of the first device and the second antenna array of the second device.

In a seventeenth aspect, the process 1200 may comprise transmitting feedback to the first device based on the estimated distance.

In an eighteenth aspect, the process 1200 may comprise receiving, from the first device, an (e.g., second) indication to estimate the parallel shift by estimating at least one of X and Y rotation of the second device, wherein the indication is based on the constant phase first pilot signal.

In a nineteenth aspect, the process 1200 may comprise receiving, from the first device, an (e.g., second) indication to estimate the parallel shift by direct estimation, wherein the indication is based on the linear phase ramped first pilot signal.

In particular, the pilot type (constant phase pilot or linear phase ramped pilot) can be used to indicate the type of estimation procedure.

In a twentieth aspect, the indication may be based on the estimated distance with respect to the first antenna array of the first device and the second antenna array of the second device.

In a twenty-first aspect, the process 1200 may comprise receiving an indication of the first pilot signal (indicating a constant phase pilot or a linear phase ramped pilot) by Radio Resource Control (RRC) signaling prior to receiving the first pilot signal.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
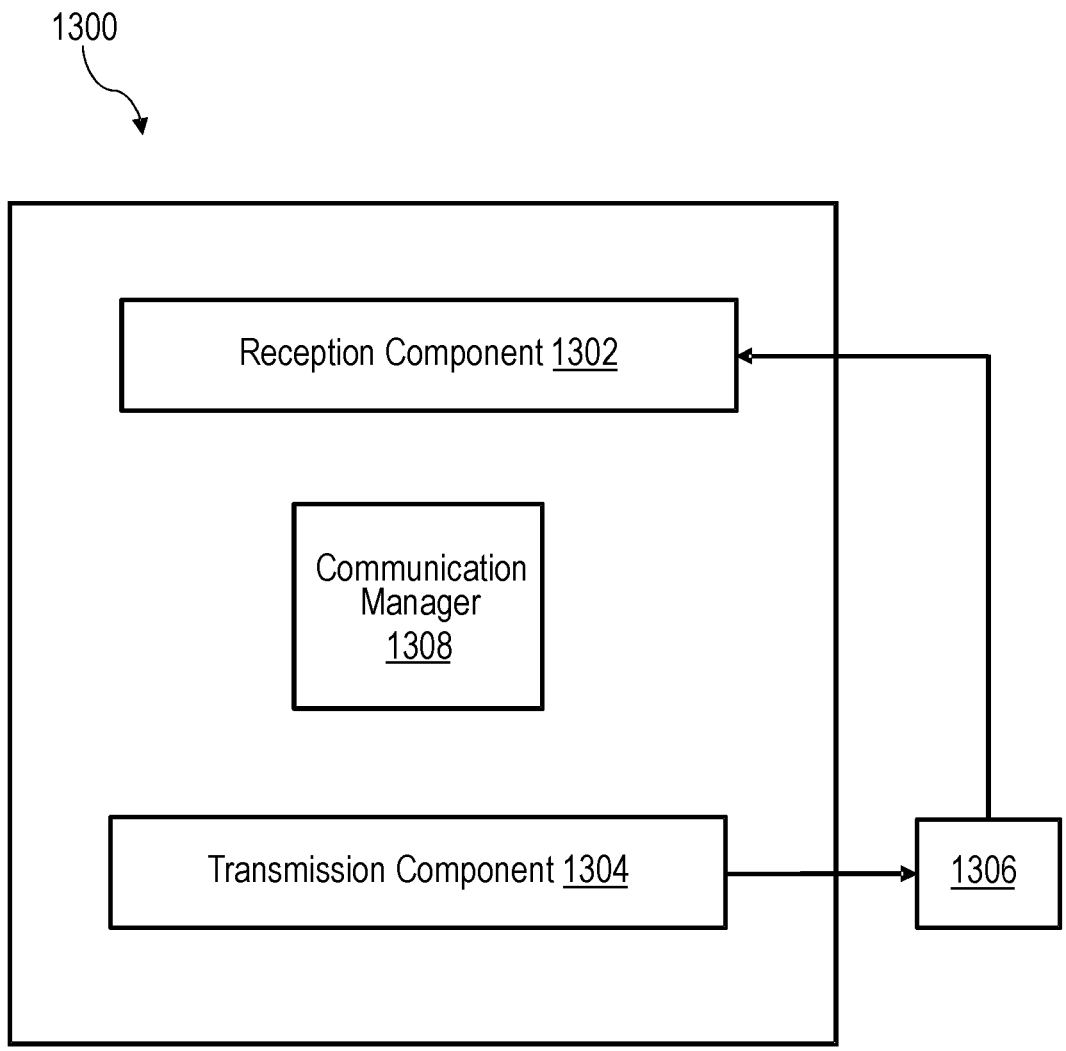
FIG. 13 illustrates a block diagram of exemplary devices that support transmitting a first pilot signal, in accordance with aspects of the present disclosure.

FIG. 13 shows a block diagram of an example device 1300 for wireless communication, relating to LOS MIMO. Please note that the term device and apparatus are used interchangeably. The device 1300 may be an example of aspects of a first device or transmitting device (e.g., a base station 105*a*, or a relay 105*d* shown in FIG. 1 etc.) as described herein. The device 1300 may include a reception component 1302, a communications manager 1308, and a transmission component 1304. The device 1300 may also include a processor. Each of these components may be in communication with one another (e.g., via one or more buses).

The communications manager 1308, or its sub-components, may be implemented in hardware, code (e.g., software or firmware) executed by a processor, or any combination thereof. If implemented in code executed by a processor, the functions of the communications manager 1308, or its sub-components may be executed by a general-purpose processor, a DSP, an application-specific integrated circuit (ASIC), a FPGA, or other programmable logic device, discrete gate or transistor logic, discrete hardware components, or any combination thereof designed to perform the functions, processors or methods described in the present disclosure.

The communications manager 1308, or its sub-components, may be physically located at various positions, including being distributed such that portions of functions are implemented at different physical locations by one or more physical components. In some examples, the communications manager 1308, or its sub-components, may be a separate and distinct component in accordance with various aspects of the present disclosure. In some examples, the communications manager 1308, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some aspects, the device 1300 may be configured to perform one or more operations described herein in connection with FIG. 5 to 8. Additionally, or alternatively, the device 1300 may be configured to perform one or more processes described herein, such as process 1100 of FIG. 11. Additionally, or alternatively, one or more components of a set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the device 1306. The reception component 1302 may provide received communications to one or more other components of the device 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the device 1306. In some aspects, the reception component 1302 may include one or more antennas, a demodulator, a MIMO detector, a receive processor, a controller/processor, a memory, or a combination thereof.

In some examples, the reception component 1302 may receive feedback from another device, based on an estimated misalignment of an antenna array of the other device with respect to an antenna array of the present device 1300.

The transmission component 1304 may transmit communications, such as reference signals, control information, data communications, or a combination thereof, to the device 1306. In some aspects, one or more other components of the device 1306 may generate communications and may provide the generated communications to the transmission component 1304 for transmission to the device 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the device 1306. In some aspects, the transmission component 1304 may include one or more antennas, a modulator, a transmit MIMO processor, a transmit processor, a controller/processor, a memory, or a combination thereof. The communication manager 1308 may determine inter-aperture orthogonality information corresponding to a plurality of aperture pairs. In some aspects, the communication manager 1308 may include a controller/processor, a memory, or a combination thereof. In some examples, the transmission component 1304 may transmit, a first pilot signal, wherein the first pilot signal may be at least one of a constant phase pilot signal, or a linear phase ramped pilot signal.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components.

Additionally or alternatively, a set of (one or more) components shown in FIG. 13 may perform one or more functions described as being performed by another set of components shown in FIG. 13.

Figure 14:
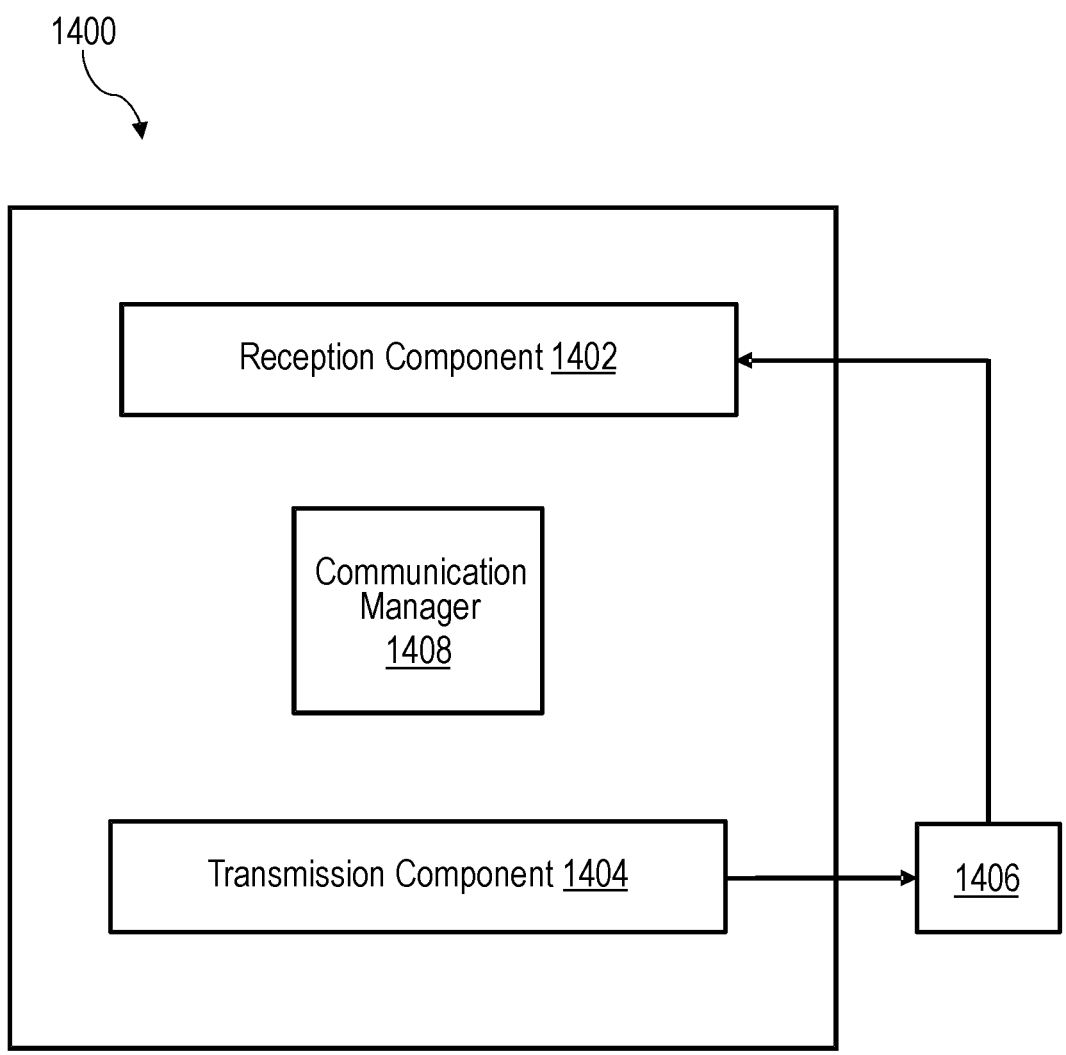
FIG. 14 illustrates a block diagram of exemplary devices that support receiving a first pilot signal, in accordance with aspects of the present disclosure.

FIG. 14 shows a block diagram of an example device 1400 for wireless communication relating to LOS MIMO. Please note that the terms device and apparatus are used interchangeably. The device 1400 may be an exemplary second device or receiving device (e.g., a UE 115, a base station 105*a*, or a relay 105*d* shown in FIG. 1 etc.) as described herein. The device 1400 may include a reception component 1402, a communications manager 1408, and a transmission component 1404. The device 1400 may also include a processor. Each of these components may be in communication with one another (e.g., via one or more buses).

The communications manager 1408, or its sub-components, may be implemented in hardware, code (e.g., software or firmware) executed by a processor, or any combination thereof. If implemented in code executed by a processor, the functions of the communications manager 1408, or its sub-components may be executed by a general-purpose processor, a DSP, an application-specific integrated circuit (ASIC), a FPGA, or other programmable logic device, discrete gate or transistor logic, discrete hardware components, or any combination thereof designed to perform the functions described in the present disclosure.

The communications manager 1408, or its sub-components, may be physically located at various positions, including being distributed such that portions of functions are implemented at different physical locations by one or more physical components. In some examples, the communications manager 1408, or its sub-components, may be a separate and distinct component in accordance with various aspects of the present disclosure. In some examples, the communications manager 1408, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some aspects, the device 1400 may be configured to perform one or more operations described herein in connection with FIG. 5 to 8. Additionally or alternatively, the device 1400 may be configured to perform one or more processes described herein, such as process 1200 of FIG. 12. Additionally or alternatively, one or more components of a set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the device 1406. The reception component 1402 may provide received communications to one or more other components of the device 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the device 1306. In some aspects, the reception component 1302 may include one or more antennas, a demodulator, a MIMO detector, a receive processor, a controller/processor, a memory, or a combination thereof. In some examples, the reception component 1402 receives a first pilot signal, from another device, wherein the first pilot signal may be at least one of a constant phase pilot signal or a linear phase ramped pilot signal.

The transmission component 1404 may transmit communications, such as reference signals, control information, data communications, or a combination thereof, to the device 1406. In some aspects, one or more other components of the device 1406 may generate communications and may provide the generated communications to the transmission component 1404 for transmission to the device 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the device 1406. In some aspects, the transmission component 1404 may include one or more antennas, a modulator, a transmit MIMO processor, a transmit processor, a controller/processor, a memory, or a combination thereof. The communication manager 1408 may determine inter-aperture orthogonality information corresponding to a plurality of aperture pairs. In some aspects, the communication manager 1408 may include a controller/processor, a memory, or a combination thereof.

In some examples, the transmission component 1404 may transmit feedback to another device, based on an estimated misalignment of an antenna array of the device 1400 with respect to an antenna array of another device.

In some examples, the transmission component may transmit a second pilot signal, to another device, wherein the second pilot signal may be at least one of a constant phase pilot signal, or a linear phase ramped pilot signal.

The number and arrangement of components shown in FIG. 14 are provided as an example. In practice, there may be additional components, fewer components, different components, or differently arranged components than those shown in FIG. 14.

Furthermore, two or more components shown in FIG. 14 may be implemented within a single component, or a single component shown in FIG. 14 may be implemented as multiple, distributed components.

Additionally or alternatively, a set of (one or more) components shown in FIG. 14 may perform one or more functions described as being performed by another set of components shown in FIG. 14.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The detailed description set forth above in connection with the appended drawings describes examples and does not represent the only examples that may be implemented or that are within the scope of the claims. The terms "example" and "exemplary", when used in this description, mean "serving as an example, instance, or illustration", and not "preferred" or "advantageous over other examples". The detailed description includes specific details for the purpose of providing an understanding of the described techniques. These techniques, however may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. Additionally or alternately, a processor may be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "or", when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication for line-of-sight Multiple-Input-Multiple-Output (LOS MIMO), by a first device, comprising:
   transmitting a first pilot signal to a second device;
   receiving a second pilot signal from the second device, wherein the second pilot is at least one of a constant phase pilot or a linear phase ramped pilot; and
   estimating a misalignment of the first antenna array of the first device with respect to the second antenna array of the second device, the estimating comprising:
      estimating a parallel shift of the first antenna array with respect to the second antenna array; and
      compensating for the estimated misalignment of the first antenna array;
   wherein the first pilot signal is at least one of a constant phase pilot, or a linear phase ramped pilot for estimating a misalignment of a second antenna array of the second device with respect to a first antenna array of the first device.

2. The method of claim 1, further comprising receiving feedback from the second device, based on the estimated misalignment of the second antenna array with respect to the first antenna array.

3. The method of claim 1, wherein the antenna array of the first device is located in a first x-y plane of a first coordinate system;
   wherein the antenna array of the second device is located in a second x-y plane of a second coordinate system, the second x-y plane being parallel to the first x-y plane,
   wherein the origin of the second coordinate system is located on the z-axis of the first coordinate system;
   wherein the parallel shift of the first antenna array is in the first x-y plane;
   wherein at least one of the first or second pilot signal is the constant phase pilot;
   wherein estimating the parallel shift comprises at least one of:
   estimating a X rotation of the first antenna array with respect to the x-axis of the first x-y plane, or
   estimating a Y rotation of the first antenna array with respect to the y-axis of the first x-y plane;
      wherein estimating the parallel shift further comprises converting the estimated X or Y rotation of the first antenna array to the parallel shift.

4. The method of claim 3, wherein estimating at least one of X rotation and Y rotation of the first antenna array is based on determining at least one phase difference between two adjacent antennas of the first antenna array.

5. The method of claim 4, further comprising:
   determining a linear phase ramp based on at least one of averaging a plurality of estimates of phase difference between respective two adjacent antennas of the first antenna array along the x-axis of the first x-y plane, or
      averaging a plurality of estimates of phase difference between respective two adjacent antennas of the first antenna array along the y-axis of the first x-y plane.

6. The method of claim 1,
   wherein at least one of the first pilot signal or second pilot signal is the linear phase ramped pilot,
   wherein estimating the parallel shift comprises direct estimation of the parallel shift;
   wherein the direct estimation is based on determining an inner product between the received pilot signal at the antennas of the first antenna array and pilot signal projected based on one or more hypotheses of an antenna array shift.

7. The method of claim 1, wherein compensating comprises beam steering based on applying the estimated parallel shift to a precoder matrix.

8. The method of claim 1, further comprising:
transmitting, to the second device, a first indication to estimate a distance of the first antenna array of the first device and the second antenna array of the second device; and
receiving feedback from the second device based on the estimated distance.

9. The method of claim 8, further comprising:
transmitting, to the second device, a second indication to estimate the parallel shift by estimating at least one of an X rotation of the second antenna array with respect to the x-axis of a second x-y plane, or a Y rotation of the second antenna array with respect to the y-axis of the second x-y plane, wherein the antenna array of the second device is located in the second x-y plane of a second coordinate system;
wherein the second indication is based on the constant phase first pilot signal.

10. The method of claim 8, further comprising:
transmitting, to the second device, a second indication to estimate the parallel shift by direct estimation,
wherein the second indication is based on the linear phase ramped first pilot signal.

11. The method of claim 1, further comprising:
transmitting, to the second device, an indication of the first pilot signal by Radio Resource Control (RRC) signaling prior to transmitting the first pilot signal.

12. The method of claim 8, further comprising:
transmitting a second indication to estimate the parallel shift by estimating at least one an X rotation of the second antenna array with respect to the x-axis of a second x-y plane, or a Y rotation of the second antenna array with respect to the y-axis of the second x-y plane, wherein the antenna array of the second device is located in the second x-y plane of a second coordinate system, when the estimated distance is below a certain threshold; or
transmitting a second indication to estimate the parallel shift by direct estimation, when the estimated distance is above a certain threshold.

13. A method of wireless communication for line-of-sight Multiple-Input-Multiple-Output (LOS MIMO), by a second device, comprising:
receiving a first pilot signal, from a first device, wherein the first pilot signal is at least one of a constant phase pilot or a linear phase ramped pilot; and
estimating a misalignment of a second antenna array of the second device with respect to a first antenna array of the first device;
wherein estimating the misalignment comprises estimating a parallel shift of the second antenna array with respect to the first antenna array.

14. The method of claim 13, further comprising transmitting feedback to the first device based on the estimated misalignment of the second antenna array with respect to the first antenna array.

15. The method of claim 13, further comprising compensating for the estimated misalignment of the second device.

16. The method of claim 13, further comprising transmitting, to the first device, a second pilot signal for estimating a misalignment of the first antenna array of the first device with respect to the second antenna array of the second device.

17. The method of claim 16, wherein the second pilot signal is at least one of a constant phase pilot or a linear phase ramped pilot.

18. The method of claim 13,
wherein the antenna array of the first device is located in a first x-y plane of a first coordinate system;
wherein the antenna array of the second device is located in a second x-y plane of a second coordinate system, the second x-y plane being parallel to the first x-y plane, wherein the origin of the second coordinate system is located on the z-axis of the first coordinate system;
wherein the parallel shift of the second antenna array is in the second x-y plane;
wherein at least the first pilot signal is a constant phase pilot;
wherein estimating the parallel shift comprises at least one of estimating a X rotation of the second antenna array with respect to the x-axis of the second x-y plane, or estimating a Y rotation of the second antenna array with respect to the y-axis of the second x-y plane; and
wherein estimating the parallel shift further comprises converting at least one of the estimated X and Y rotation of the second antenna array to the parallel shift.

19. The method of claim 18, wherein estimating the at least one of X rotation and Y rotation of the second antenna array is based on determining at least one phase difference between two adjacent antennas of the second antenna array.

20. The method of claim 19, further comprising:
determining a linear phase ramp based on at least one of:
averaging a plurality of estimates of phase difference between respective two adjacent antennas of the second antenna array along the x-axis of the second x-y plane; or
averaging a plurality of estimates of phase difference between respective two adjacent antennas of the second antenna array along the y-axis of the second x-y plane.

21. The method of claim 13,
wherein at least the first pilot signal is a linear phase ramped pilot;
wherein estimating the parallel shift comprises direct estimation of the parallel shift,
wherein the direct estimation is based on determining an inner product between the received linear phase ramped pilot at the antennas of the second antenna array and a linear phase ramped pilot projected based on one or more hypothesis of an antenna array shift.

22. The method of claim 13, further comprising compensating for the estimated misalignment of the second device, wherein compensating comprises beam steering, based on applying the estimated parallel shift to a post-processing matrix.

23. The method of claim 13, further comprising:
receiving, from the first device, a first indication to estimate a distance of the first antenna array of the first device and the second antenna array of the second device;
estimating the distance with respect to the first antenna array of the first device and the second antenna array of the second device; and
transmitting feedback to the first device based on the estimated distance.

24. The method of claim 23,
wherein estimating the misalignment comprises estimating a parallel shift of the second antenna array with respect to the first antenna array;
and the method further comprising:
receiving, from the first device, a second indication to estimate the parallel shift by estimating at least one of an X rotation of the second antenna array with respect to the x-axis of a second x-y plane, or a Y rotation of the second antenna array with respect to the y-axis of the second x-y plane, wherein second the antenna array of the second device is located in the second x-y plane of a second coordinate system;
wherein the second indication is based on the constant phase first pilot signal.

25. The method of claim 23,
the method further comprising:
receiving, from the first device, a second indication to estimate the parallel shift by direct estimation,
wherein the second indication is based on the linear phase ramped first pilot signal.

26. The method of claim 13, further comprising receiving an indication of the first pilot signal by Radio Resource Control (RRC) signaling prior to receiving the first pilot signal.

27. An apparatus for wireless communication for line-of-sight (LOS) MIMO, of a first device, comprising:
one or more processors,
one or more memories in electronic communication with the one or more processors, and
instructions stored in the memory, wherein the instructions are executable by the one or more processors to cause the apparatus to:
transmit a first pilot signal to a second device, wherein the first pilot signal is at least one of a constant phase pilot or a linear phase ramped pilot for estimating a misalignment of a second antenna array of the second device with respect to a first antenna array of the first device;
transmit, to the second device, a first indication to estimate a distance of the first antenna array of the first device and the second antenna array of the second device; and
receive feedback from the second device based on the estimated distance.

28. An apparatus for wireless communication for line-of-sight (LOS) MIMO, of a second device, comprising:
one or more processors,
one or more memories in electronic communication with the one or more processors, and
instructions stored in the memory, wherein the instructions are executable by the one or more processors to cause the apparatus to:
receive a first pilot signal, from a first device, wherein the first pilot signal is at least one of a constant phase pilot or a linear phase ramped pilot; and
estimate a misalignment of a second antenna array of the second device with respect to a first antenna array of the first device, wherein the estimation comprises an estimation of a parallel shift of the second antenna array with respect to the first antenna array.

* * * * *